United States Patent [19]
Stone

[11] Patent Number: 5,546,390
[45] Date of Patent: Aug. 13, 1996

[54] METHOD AND APPARATUS FOR RADIX DECISION PACKET PROCESSING

[75] Inventor: Geoffrey C. Stone, Minneapolis, Minn.

[73] Assignee: Storage Technology Corporation, Louisville, Colo.

[21] Appl. No.: 366,222

[22] Filed: Dec. 29, 1994

[51] Int. Cl.⁶ .................... H04L 12/56; G06F 9/28
[52] U.S. Cl. .................. 370/60; 370/94.2; 395/650; 395/800
[58] Field of Search ................... 370/58.1, 58.2, 370/58.3, 60, 60.1, 61, 79, 82, 83, 85.13, 85.14, 94.1, 94.2, 94.3, 99; 395/200, 325, 375, 650, 800

[56] References Cited

U.S. PATENT DOCUMENTS

| | | | |
|---|---|---|---|
| 4,750,175 | 6/1988 | Brenneman et al. | 371/22 |
| 5,105,424 | 4/1992 | Flaig et al. | 370/94.1 |
| 5,134,610 | 7/1992 | Shand et al. | 370/60 |
| 5,249,292 | 9/1993 | Chiappa | 395/650 |
| 5,278,834 | 1/1994 | Mazzola | 370/94.1 |
| 5,280,476 | 1/1994 | Kojima et al. | 370/60.1 |
| 5,321,691 | 6/1994 | Pashan | 370/58.3 |
| 5,321,692 | 6/1994 | Wallmeier | 370/60 |
| 5,414,702 | 5/1995 | Kudoh | 370/60 |
| 5,414,707 | 5/1995 | Johnston et al. | 370/79 |
| 5,430,709 | 7/1995 | Galloway | 370/13 |

OTHER PUBLICATIONS

Tsuchiya, Paul, A Search Algorithm for Table Entries with Non–Contiguous Wildcarding, Abstract pp. 1–7.
Sedgewick, R, *Algorithms in Ctt*, "Radix Searching", Chapter 17, 1992, pp. 245–258.

*Primary Examiner*—Alpus H. Hsu
*Attorney, Agent, or Firm*—Timothy R. Schulte

[57] ABSTRACT

A decision process is optimized through selectively examining only those bits of a protocol data unit received from a communication network which affect the decision process. These decision-significant bits include two non-contiguous bits of the protocol data unit. Subsequently, a portion of the received protocol data unit is compared with a predetermined tuple to validate the decision process. The predetermined tuple includes known values for a specific portion of the protocol data unit having the two non-contiguous decision-significant bits. Associated directives are generated for the protocol data unit based upon the validated decision process. Alternatively, this processing is a radix tree-type decision process in which the decision-significant bits are grouped together into decision groups and decisions are made based on decision groups rather than individual decision-significant bits. In addition, a preprocessing device, a decision processor, and a protocol data unit processing system are provided which perform either decision process.

31 Claims, 11 Drawing Sheets

METHOD AND APPARATUS FOR RADIX DECISION PACKET PROCESSING

RELATED INVENTIONS

The present invention is related to:

Co-pending U.S. patent application Ser. No. 08/366,221, filed on Dec. 23, 1994, which is entitled "Method And Apparatus For Accelerated Packet Forwarding" by Mark Bakke et al., Co-pending U.S. patent application Ser. No. 08/366,225, filed on Dec. 23, 1994, which is entitled "Method And Apparatus For Accelerated Co-pending U.S. patent application Ser. No. 08/366,227, filed on Dec. 23, 1994, which is entitled "Method And Apparatus For virtual Switching" by Ken Hardwick, et al.;

and which were all filed concurrently herewith and assigned to the assignee of the present invention.

FIELD OF THE INVENTION

The present invention relates generally to data communication networks. More particularly, the present invention relates to radix tree-type decision processing of protocol data units in the communication networks.

BACKGROUND OF THE INVENTION

In a data communication network, a forwarding device (e.g., a data packet switch) directs protocol data units (e.g., data packets) from one network node to another. These data packets may include voice, video, or data information as well as any combination thereof.

To better understand how forwarding devices work within a data communication network, an analogy may be helpful. In many respects, data communication networks are similar to postal delivery systems, with pieces of mail, such as letters or packages, being comparable to the data packets which are transferred within a data communication network. In a postal delivery system, the pieces of mail may be input into the postal delivery system in a variety of ways. Once within the postal delivery system, all of the pieces of mail are collected and transported to nearby processing facilities where the pieces of mail are sorted for further processing. Although each piece of mail will have a unique delivery address, most of the pieces of mail are automatically sorted by a shorter zip code or some other type of routing code. Letters without zip codes must be sorted and processed by hand. Some postal delivery systems also have special forms of encoded delivery addresses, such as Post Office box numbers at a Post Office, which are not recognizable by other postal delivery systems such as Federal Express or United Parcel Service. Regardless of which particular postal delivery system the piece of mail is deposited into, once the mail has been sorted by destination it is routed through additional intermediary processing facilities until it arrives at the local indicated by the destination on the piece of mail. At this point, the zip code or routing code is no longer sufficient to deliver the piece of mail to the intended destination and the local delivery office must further decode the destination address in order to deliver the piece of mail to the intended recipient. In addition to processing pieces of mail for routing the mail to the correct destination, the pieces of mail may go on through several other processing steps. For example, if the piece of mail is going out of the country, it must go through a customs operation in each country. If the national postal delivery system is being used to deliver the piece of mail then it must also be transferred from one national postal delivery system to another. In a private postal delivery system however, this transfer step would not be necessary. The pieces of mail may also be monitored or filtered for such things as mail fraud violation or shipment of hazardous materials.

Data packets are manipulated in a data communication network in a manner similar to that by which pieces of mail are delivered in a postal delivery system. Data packets, for example, are generated by many different types of devices and are placed onto a communication network. Typically, the data packets are concentrated into a forwarding device, such as a local bridge or router, and are then directed by destination over one or more media types (e.g., fiber optic) which are connected to destination devices that could be other larger or smaller bridges or routers. These destination devices then deliver the data packet to its terminal end point (i.e., the end user). Along the way the data communication network may perform filtering and monitoring functions with respect to the data packets.

Just like postal delivery systems have experienced ever increasing volumes of mail which must be delivered, the volume of protocol data units being transferred across computer networks continues to increase as experience is being gained with this new form of communication delivery system and as more and more applications, with more and more expansive means are being developed. In addition, quickly changing technology has made the underlying data transmission resources for computer communication networks relatively inexpensive. Fiber optics, for example, offer data transfer rates in the gigabyte per second range.

The capability or through put of a forwarding device and a computer communication network can be measured either by the number of data packets per second or by the number of bits per second which pass through the forwarding device. The former measure is important because in typical network traffic, the bulk of protocol data units or data packets are small and the critical parameter is how many data packets a forwarding device can handle. If network traffic is weighted by packet size, however, the bulk of the data is carried in large packets. In large bulk data transfers, the second measure of how many bits are being transferred is more important regardless of the number of data packets that are handled. This tension between packet transfer rate versus bit transfer rate is a continuing dichotomy in through put measurements of forwarding devices. Regardless of which through put measure is used, there is a need for through put rates that are substantially higher than the through put rates currently available in forwarding devices.

The existing types of forwarding devices which offer the greatest potential to meet the increasing demand on through put rates are packet switches. Several classes of packet switches exist. Each class differs substantially from the other class of devices, but all may be commonly referred to as packet switches or forwarding devices.

A first class of packet switches is that commonly used in digital telephone exchanges. By analogy, these switches can perform the functions only of a mail carrier picking up and delivering mail along a single route. These switches are intended only to transfer packets among the devices in a single station, such as a telephone exchange. The format of the packet in these systems is chosen to make the hardware in the switch as simple as possible; and this usually means that the packets include fields designed for direct use by the hardware. The capabilities of this class of switches (for example, in such areas as congestion control) are very limited in order to keep the hardware simple.

A second class of packet switches is used in smaller or restricted computer networks, such as X.25 networks. By analogy, these switches are equivalent to the Post Office in a single town with no connection to other Post Offices. In some sense, these switches are little different from the first class of packet switches described above, but there is one substantial difference. The format of the packets (that is, the protocols) handled by the second class of packet switches is much more complex. This greater complexity is necessary because the protocols are designed to work in less restricted environments, and because the packet switches must provide a greater range of services. While the formats interpreted by the first class of switches are chosen for easy implementation in hardware, the data packets handled by this second class of switches are generally intended to be interpreted by software (which can easily and economically handle the greater complexity) and provides the inherit benefit of incremental flexibility in the design of the packet switch.

In a third class of packet switches, the packet protocols are intended to be used in very large data networks having many very dissimilar links (such as a mix of very high speed local area networks (LANs) and low speed long distance point to point lines). Examples of such protocols are the United States designed Transmission Control Protocol/Internetwork Program (TCP/IP), and the International Standards Organization's Internetworking Protocol/Connectionless Network Service (IP/CLNS) protocols.

In addition, this third class of switches (commonly referred to as bridge/routers) often must handle multiple protocols simultaneously. This third class of switches is very similar to the mail processing devices used in the modern postal system. Just as there are many countries, there are many data packet protocols used in computer networks. While a single postal system was once thought to be sufficient to handle mail going anywhere in the world, today several competing systems like United Parcel Service, Federal Express, and the U.S. Postal Service exist to handle the special needs of mail going to every country, state, city, town, and street in the world. Similarly, in computer communication systems, the packet switches are more involved in the carrying of data, and must understand some of the details of each protocol to be able to correctly handle data packets which are being conveyed in that protocol. The routers in this third class of packet switches often have to make fairly complex changes to the data packets as they pass through the packet switch.

It is this latter class of packet switches to which the following detailed description primarily relates. It will be appreciated however, that the detailed description of this invention can readily be applied to the first and second class of switches as well. In current conventional packet switch design, a programmed general purpose processor examines each data packet as it arrives over the network interface and then processes that packet. Packet processing requires assignment of the data packet to an outbound network interface for transmission over the next communications link in the data path. While attempts are being made to build higher speed packet switches, based on this architecture of using general purpose processors, the attempts have not been very successful. One approach is to use faster processors, another is to make the software run faster, and a third is to apply multiple processors to the processing task. All of these approaches fail to meet the increasing performance demands for packet switches for the reasons noted below.

The approach which uses faster processors simply keeps pace with processor dependent (future) demands because the traffic which the packet switch will handle will depend upon the speed of the user processors being used to generate the traffic. Those user processors, like the processors in the packet switches, will increase in speed at more or less the same rate. Accordingly, there is no overall increase in the ability of the future packet switch over present packet switches, relative to traffic load. Furthermore, this approach may be impractical as not being cost-effective for widespread use. For example, two high speed machines, distant from each other, must have intermediate switches which are all equally as powerful; deployment on a large scale of such expensive switches is not likely to be practicable.

The approach which increases the execution rate of the software itself by, for example, removing excess instructions or writing the code in assembly language, leads to a limit beyond which an increase in performance cannot be made. The gains which result are typically small (a few percent) and the engineering costs of such distortions in the software are significant in the long term. This type of assembly code optimization restricts the ability to enhance the software as well as port the software to a different processor platform.

The use of multiple processors to avoid the "processor bottleneck" provides some gains but again has limits. Given a code path to forward a data packet, it is not plausible to split that path into more than a few stages. Typically these stages would involve network input, protocol functions, and network output. The basis for this limitation is the overhead incurred to interface the different processors beyond a limited number of task divisions. That is, after a certain point, the increase in interface overhead outweighs the savings obtained from the additional stage. This is particularly true because of the need to tightly integrate the various components; for example, congestion control at the protocol level requires close coordination with the output device. Also, the interface overhead costs are made more severe by the complication of the interface which is required.

Currently, most bridge/router implementations rely heavily on off-the-shelf microprocessors to perform the packet forwarding functions. The best implementations are able to sustain processing rates approaching 100,000 packets per second (PPS). When dealing with media such as ethernet or current telecommunications lines, this processing rate is more than adequate. When faster media such as Fiber Distributed Data Interchange (FDDI) is used, existing processing rates may still be sufficient as long as there is only one such high packet rate interface present. When multiple high packet rate interfaces are used, 100,000 PPS become inadequate. Current software-based implementations for bridges/routers are simply not capable of media-rate packet forwarding on emerging media such as asynchronous transfer mode (ATM) or Optical Connection-12 Synchronous Optical Network (OC-12 SONET) which can accommodate communication rates up to 6 times the current 100 megabits per second limits to rates of 600 megabit per second.

It should be noted that the ever increasing power of off-the-shelf microprocessors might solve the throughput problem, but this is probably a vain hope. For example a single OC-24 ATM interface can sustain nearly 3 million internetworking protocol (IP) packets per second. This is over 30 times the rates achieved by the current best software techniques. If processing power doubles every year, the wait for sufficient processing power to make a software approach viable would be at least 4–5 years. In addition, the media capabilities will likely continue to increase over such a span of years. Additionally, any such processor will likely require large amounts of the fastest (most expensive) memory available to operate at full speed, resulting in an unacceptably high system cost.

In general then, the multiprocessor approach is not the answer to substantially increasing the throughput of the packet switching network. This has been borne out by several attempts by technically well-regarded groups to build packet switches using this approach. While aggregate throughput over a large number of interfaces can be obtained, this is, in reality, little different than having a large number of small switches. It has thus far proven implausible to substantially speed up a single stream using the multiprocessing approach.

A need still exists for an improved protocol data unit (i.e., frame, cell, or packet) forwarding system which solves the above-identified problems in a manner which can better handle large numbers of input streams, large numbers of output destinations and lines, many different types of communication protocols, and large and small data packets at both high bit throughput rates and high packet throughput rates, while maintaining reasonable costs and complexity.

SUMMARY OF THE INVENTION

The present invention provides a packet processing system with improved throughput performance by means of a method and apparatus for radix decision processing of protocol data units. The present invention addresses the problem of media rate forwarding of packets at gigabyte rates by providing a searching algorithm and associated architecture for the design of bridges/routers that are capable of processing packets across different media which can sustain multi-gigabyte rates. By using these searching algorithms, the present invention reduces the affect of a "processor bottleneck" by reducing processing requirements and increasing the time efficiency of decision processes of the present invention packet processing system over prior art processing device searching algorithms and architectures. The present invention is able to significantly increase the through put of processing devices which use these searching algorithms, both in terms of the number of data packets per second and in terms of the number of bits per second which pass through the processing devices. With reference to the postal delivery analogy, the present invention can be likened to a system which both: (1) increases the speed at which pieces of mail can be moved through the postal delivery system by only looking at relevant information contained in an address and (2) relieves any single postal worker from making all of the important decisions on where and how the pieces of mail are to be handled.

In accordance with a first aspect of the invention, a device-implemented method is used to process a protocol data unit in a communication network. This processing method includes optimizing a decision process (e.g., identifying the protocol data unit) by selectively examining only those bits of a protocol data unit, represented by a stream of bits received from the communication network, which affect the decision process. This selective examination of bits preferably is done according to a radix-type decision process. Also, this selective examination may be enhanced by examining several decision-significant bits of the protocol data unit in a single step of the decision process. These decision-significant bits preferably are two or more non-contiguously positioned bits out of the stream of bits which represent the received protocol data unit. In addition, the decision-significant bits may further include two or more contiguously positioned bits out of the protocol data unit stream. Subsequently, the decision process is validated by comparing a portion of the received protocol data unit with a predetermined tuple. This validation process may be enhanced by splitting the validation into parts by beginning validating after a portion of the decision process is completed and before all of the decision process is completed. The predetermined tuple having known values for a specific portion of the stream of bits which includes the two or more non-contiguously positioned decision-significant bits. Associated directives for the protocol data unit are generated based upon the validated decision process. This at least one associated directive specifying subsequent processing requirements of the protocol data unit.

This first aspect of the invention also can be implemented in a protocol data unit preprocessing device for use in a communication network to optimize a decision process related to protocol data units within the communication network. The preprocessing device includes a filter to selectively examine only those bits of a protocol data unit, represented by a stream of bits received from the communication network, which affect the decision process. These decision-significant bits consist of two or more non-contiguously positioned bits out of the stream of bits which represent the received protocol data unit. In addition, the decision-significant bits may further include two or more contiguously positioned bits out of the protocol data unit stream. A validation device is operatively coupled to the filter to validate the decision process by comparing a portion of the protocol data unit with a predetermined tuple. The predetermined tuple having known values for a specific portion of the stream of bits which includes at least the two or more non-contiguously positioned decision-significant bits. Also, a generator is operatively coupled to the validation device to generate one or more associated directives for the protocol data unit which are based upon the validated decision process. These one or more associated directives preferably specify subsequent processing requirements of the protocol data unit.

The preprocessing device can be configured to perform several different types of decision processes. For example, the filter, validation device, and generator may be configured to identify the protocol data unit type, source or destination address, and/or bit content.

The preprocessing device filter may be optimally configured to selectively examine decision-significant bits of the protocol data unit according to a radix-type decision process. Also, the filter may be configured to selectively examine several decision-significant bits of the protocol data unit in a single step of the decision process to reduce processing steps and avoid "processor bottlenecks".

The preprocessing device validation device may further reduce processing load on individual processors by splitting the validation into parts such that validation is begun after a portion of the decision process is completed and before all of the decision process is completed.

This preprocessing device can be used in a protocol data unit processing system operated in the communication network to transfer protocol data units within the communication network. This processing system preferably also includes a synchronizing mechanism operatively coupled to the preprocessing device and the communication network. This synchronizing mechanism synchronizes the received protocol data unit with the one or more associated directives for the protocol data unit to generate a synchronized protocol data unit. Also, a restructuring mechanism is operatively coupled to the synchronizing mechanism to restructure the synchronized protocol data unit in accordance with the one or more associated directives for the protocol data unit to generate a restructured protocol data unit.

Further efficiency is provided by configuring the preprocessing device to interleave processing of both a first and a second protocol data unit during a single time span. This interleaving can be accomplished by dividing the preprocessing device operations into a first and a second preprocessor operatively connected in series such that the first preprocessor begins the processing necessary for implementing the filter and the second preprocessor completes the processing necessary for implementing the generator. In addition, the synchronizing mechanism must be configured to synchronize both the first and the second protocol data unit with the one or more associated directives for that particular protocol data unit.

The processing system restructuring mechanism preferably is configured to restructure the synchronized protocol data unit by deleting, inserting, and replacing bits in the synchronized protocol data unit in accordance with the one or more associated directives for the protocol data unit. Alternatively, processing system restructuring mechanism may be configured to monitor the synchronized protocol data unit by dropping, sending, sending a copy of, and auditing the contents of the synchronized protocol data unit in accordance with the one or more associated directives for the protocol data unit.

The processing system may further include a receiver operatively coupled to the preprocessing device to receive the protocol data unit from the communication network. In addition, the processing system may further include a transmitter operatively coupled to the restructuring mechanism to transmit the reconstructed protocol data unit over the communication network.

In accordance with a second aspect of the invention, a device-implemented method is used to radix-type decision process a protocol data unit in a communication network. This processing method includes selectively examining only those bits of a protocol data unit, represented by a stream of bits received from the communication network, which affect the radix-type decision process. These decision-significant bits preferably are two or more non-contiguously positioned bits out of the stream of bits which represent the received protocol data unit. In addition, the decision-significant bits may further include two or more contiguously positioned bits out of the protocol data unit stream. Subsequently, the decision-significant bits are grouped together into decision groups. Decisions in the decision process then are made based on decision groups rather than individual decision-significant bits. This decision process preferably includes identifying, verifying, and determining subsequent processing needs of the protocol data unit.

This second aspect of the invention also can be implemented in a radix-based decision processor for use in a communication network. The decision processor includes a filter to selectively examine only those bits of a protocol data unit, represented by a stream of bits received from the communication network, which affect a radix-type decision process. These decision-significant bits consist of two or more non-contiguously positioned bits out of the stream of bits which represent the received protocol data unit. In addition, the decision-significant bits may further include two or more contiguously positioned bits out of the protocol data unit stream. A grouping device is operatively coupled to the filter to group the decision-significant bits together into decision groups. A decision mechanism is operatively coupled to the grouping device to make decisions in the decision process based on decision groups rather than individual decision-significant bits. The decision mechanism preferably consists of components to implement a decision process which includes identifying, verifying, and determining subsequent processing needs of the protocol data unit.

This decision processor can be used in a protocol data unit processing system operated in the communication network to transfer protocol data units within the communication network. When used in a protocol data unit processing system, the decision processor preferably includes a generator which generates one or more associated directives derived from the determined subsequent processing needs of the protocol data unit. This processing system preferably operates in a manner similar to that which was described for the first aspect of the present invention such that this processing system preferably also includes a synchronizing mechanism operatively coupled to the decision processor and the communication network. This synchronizing mechanism synchronizes the received protocol data unit with the one or more associated directives for the protocol data unit to generate a synchronized protocol data unit. Also, a restructuring mechanism is operatively coupled to the synchronizing mechanism to restructure the synchronized protocol data unit in accordance with the one or more associated directives for the protocol data unit to generate a restructured protocol data unit.

Further efficiency is provided by configuring the decision processor to interleave processing of both a first and a second protocol data unit during a single time span. This interleaving can be accomplished by dividing the decision processor operations into a first and a second processor operatively connected in series such that the first processor begins the processing necessary for implementing the filter and the second processor completes the processing necessary for implementing the decision mechanism. In addition, the synchronizing mechanism must be configured to synchronize both the first and the second protocol data unit with the one or more associated directives for that particular protocol data unit.

The processing system restructuring mechanism preferably is configured to restructure the synchronized protocol data unit by deleting, inserting, and replacing bits in the synchronized protocol data unit in accordance with the one or more associated directives for the protocol data unit. Alternatively, processing system restructuring mechanism may be configured to monitor the synchronized protocol data unit by dropping, sending, sending a copy of, and auditing the contents of the synchronized protocol data unit in accordance with the one or more associated directives for the protocol data unit.

The processing system may further include a receiver operatively coupled to the decision processor to receive the protocol data unit from the communication network. In addition, the processing system may further include a transmitter operatively coupled to the restructuring mechanism to transmit the reconstructed protocol data unit over the communication network.

These and various other features as well as advantages which characterize the present invention will be apparent upon reading of the following detailed description and review of the associated drawings.

DETAILED DESCRIPTION OF THE PREFERRED EMBODIMENT

Figure 1:
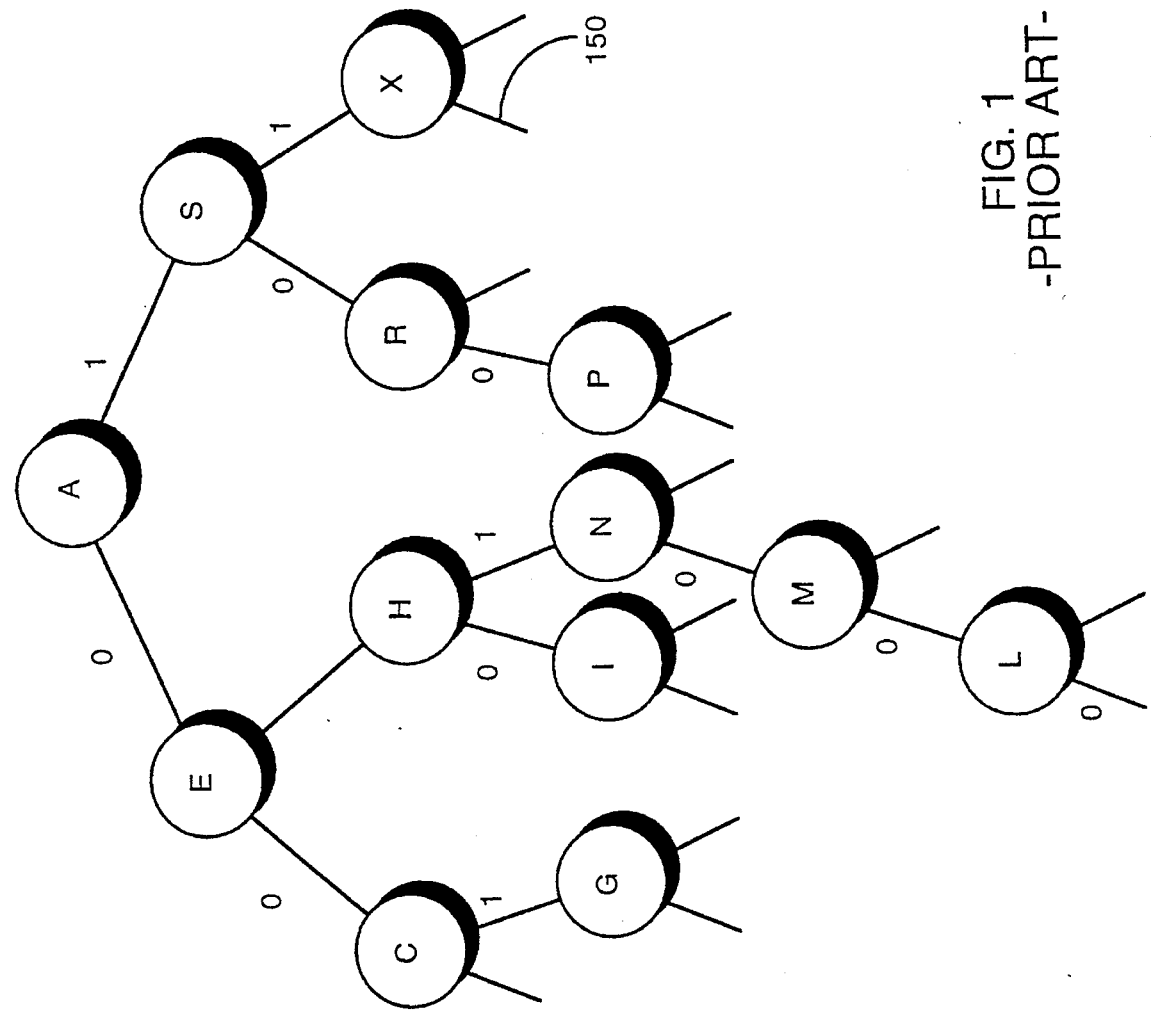
FIG. 1 is a block diagram of a prior art digital search tree.

Decision processes in general have been implemented in microprocessors and the like in several different ways. The present invention focuses on optimal searching methods for decision processes. Several known prior art searching methods exist including binary, b-tree, hashing, and radix searching methods. Some of the more useful searching methods proceed by examining the search keys one bit at a time (rather than using full comparisons between keys at each step). These methods, called radix searching methods, work with the bits of the keys themselves, as opposed to the transformed version of the keys as used in hashing. These radix searching methods can be useful when the bits of the search keys are easily accessible and the values of the search keys are well distributed. Radix searching is described in the book entitled *Algorithms in C++*, Sedgewick, R., Addison-Wesley Publ. Co., Reading, Mass., (1992), within chapter 17. found on pages 245 through 258.

The principal advantages of radix searching methods are that: (1) they provide reasonable worst-case performance without the complication of balanced trees, (2) they provide an easy way to handle variable-length keys, (3) some allow some savings in space by storing part of the key within the search structure, (4) and they can provide very fast access to data, competitive with both binary search trees and hashing. The disadvantages are that biased data can lead to generated trees with bad performance (and data comprised of characters is biased) and that some of the methods can make very inefficient use of space. Also, these radix search methods are designed to take advantage of particular characteristics of the computer's architecture: since they use digital properties of the keys, it's difficult or impossible to do efficient implementations in high level computer programming languages such as Pascal.

The simplest radix search method is digital tree searching: the algorithm is precisely the same as that for binary tree searching, except that rather than branching in the tree based on the result of the comparison between the keys, radix search methods branch according to the key's bits. At the first level the leading bit is used, at the second level the second leading bit, and so on until an external node is encountered. The software code to implement this is virtually the same as the code for binary tree search. The only difference is that the key comparisons are replaced by calls on the bits function (e.g., a bits (x,k,j) function is the j bits which appear k from the right and can be efficiently implemented in machine language by shifting right k bits then setting to 0 all but the rightmost j bits).

Equal keys are anathema in radix searching in general; however this is not the case in the above-described algorithm. Thus for the purposes of the following discussion, all the keys which appear in the data structure are assumed to be distinct (e.g., not repeated in the data structure). To enable further discussions of examples, Table 1 is provided which provides some keys based on with letter of the alphabet being represented by the five-bit binary representation of i.

TABLE 1

| | |
|---|---|
| A | 00001 |
| B | 10011 |
| E | 00101 |
| R | 10010 |
| C | 00011 |
| H | 01000 |
| I | 01001 |
| N | 01110 |
| G | 00111 |
| X | 11000 |
| M | 01101 |
| P | 10000 |
| L | 01100 |

To be consistent with the example bits function, the bits of Table 1 are numbered 0 through 4, from right to left. Thus, bit 0 is A's only nonzero bit and bit 4 is P's only nonzero bit.

The procedure for building a digital search tree is similar to that which is used to build a binary search tree. This can be easily described in reference to an example prior art digital tree structure shown in FIG. 1. To see how the digital search tree building algorithm works, consider what happens when a new key Z=11010 is added to the tree in FIG. 1. The algorithm moves right twice because the leading two bits of Z are 1, then it goes left, where an external node 150 at the left of X is encountered and this is where Z is inserted.

The worst case for trees built with digital searching will be much better than for binary search trees. The length of the longest path in a digital search tree is the length of the longest match in the leading bits between any two keys in the tree, and this is likely to be relatively short. And it is obvious that no path will ever be any longer than the number of bits in the keys (e.g., a digital search tree built from eight-character keys with six bits per character will have no path longer than 48, even if there are hundreds of thousands of keys). For random keys, digital search trees are nearly perfectly balanced (the height is about log N). Thus, they provide an attractive alternative to standard binary search trees, provided that bit extraction can be done as easily as key comparison (which is not really the case in Pascal).

It is quite often the case that search keys are very long, perhaps consisting of twenty characters or more. In such a situation, the processing time and hardware needs cost of comparing a search key for equality with a key from the data structure can be a dominant cost which cannot be neglected. Digital tree searching uses such a comparison at each tree node; however by modifying digital tree searching procedures it is possible to have only one comparison per search in most cases.

The idea is to not store keys in tree nodes at all, but rather to put all the keys in external nodes of the tree. Two types of nodes are now formed. Internal nodes which just contain links to other nodes. Also, external nodes which contain keys and no links. This type of structure is well known as "trie" because it is useful for retrieval. To search for a key in such a structure, the algorithm branches according to the bits of the string being compared, as above, but no comparison is done until an external node is encountered. Each key in the tree is stored in an external node on the path described by the leading bit pattern of the key and each search key winds up at one external node, so one full key comparison completes the search.

Figure 2:
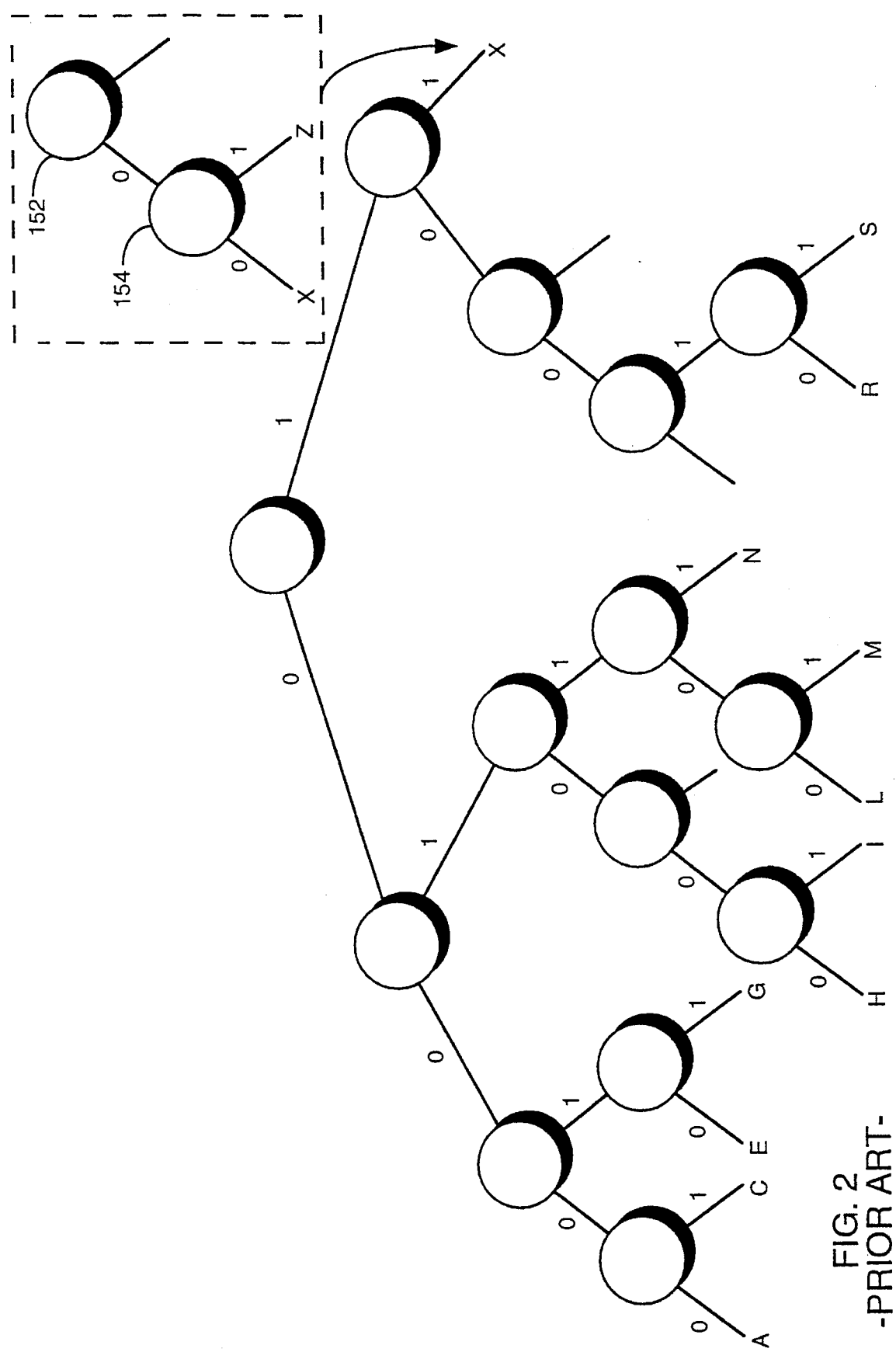
FIG. 2 is a block diagram of a prior art binary radix "trie" search tree.

After an unsuccessful search, the key sought can be inserted by replacing the external node which terminated the search by an internal node which will have the key sought and the key which terminated the search in external nodes below it. Unfortunately, if these keys agree in more bit positions, it is necessary to add some external nodes which do not correspond to any keys in the tree (or put another way, some internal nodes which have an empty external node as a son). Shown in FIG. 2 is the (binary) radix search "trie" for the sample keys of Table 1. Now inserting Z=11010 into this tree involves replacing X with a new internal node 152 whose left son is another new internal node 154 whose sons are X and Z.

The left subtree of a binary radix search "trie" has all the keys which have 0 for the leading bit and the right subtree has all the keys which have 1 for the leading bit.

An annoying feature of radix "tries" is that "one-way" branching required for keys with a large number of bits in common. For example, keys which differ only in the last bit require a path whose length is equal to the key length, no matter how many keys there are in the tree. The number of internal nodes can be somewhat larger than the number of keys. The height of such trees is still limited by the number of bits in the keys, but we would like to consider the possibility of processing records with very long keys (say 1000 bits or more) which perhaps have some uniformity, as might occur in character encoded data (e.g., protocol data units in a communication network). One way to shorten the paths in the trees is to use many more than two links per node (though this exacerbates the "space" problem of using too many nodes); another way is to "collapse" paths containing one-way branches into single links.

Figure 3:
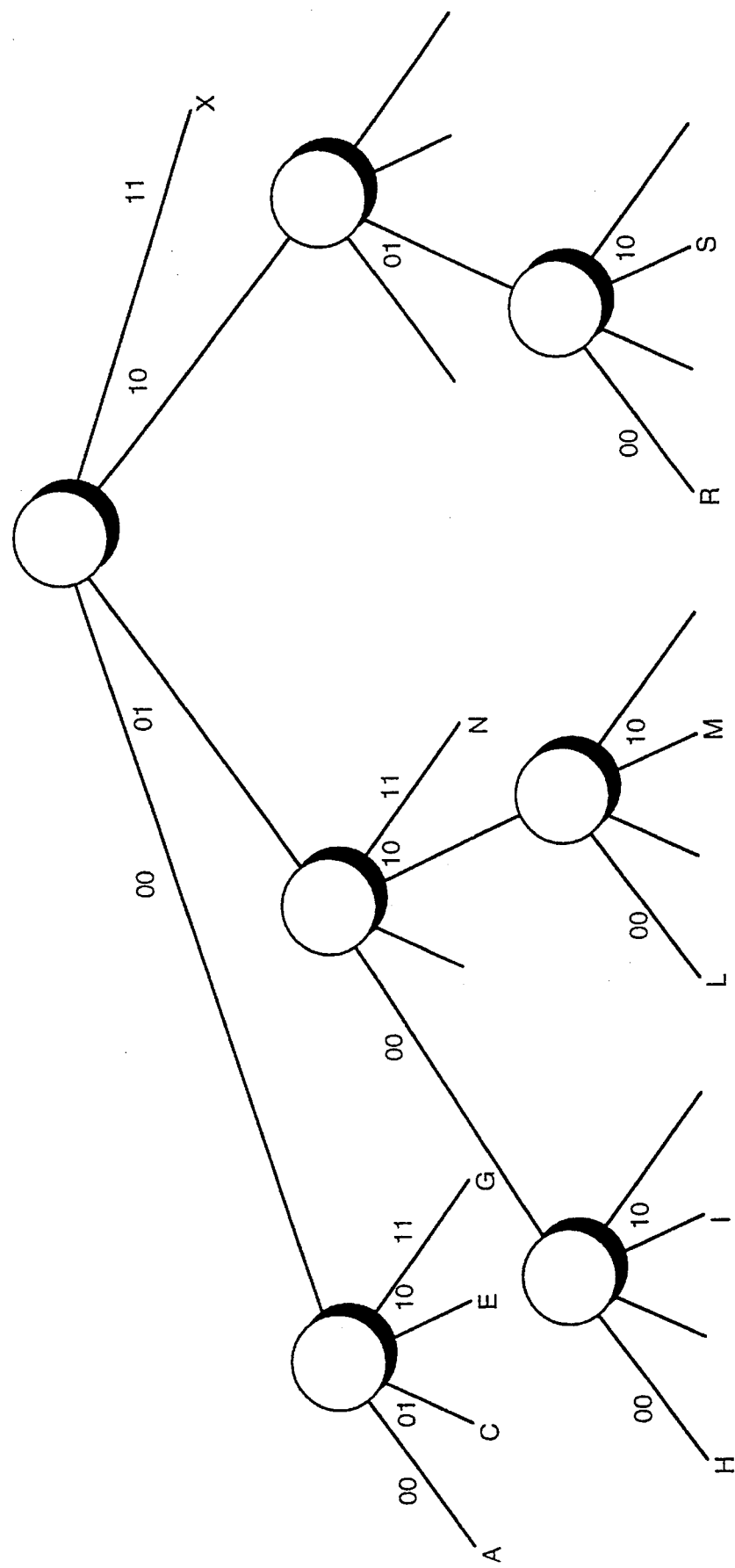
FIG. 3 is a block diagram of a prior art multiway radix search tree.

A significant improvement in processing speed can be achieved by considering more than one bit at a time. By examining m bits at a time, the radix search speed can be increased by a factor of $2^m$. However, there's a catch which makes it necessary to be more careful in applying this idea. The problem is that considering m bits at a time corresponds to using tree nodes with $M=2^m$, links, which can lead to a considerable amount of wasted space for unused links. For example, if M=4 the prior art multiway radix search tree shown in FIG. 3 is formed for the sample keys of Table 1. Note that there is some wasted space in this tree because of the large number of unused external links. As M gets larger, this effect gets worse; it turns out that the number of links used is about $MN/\log_e M$ for random keys. On the other hand this provides a very efficient searching method: the running time is about $\log_M N$. A reasonable compromise can be struck between the time efficiency of multiway "tries" and the space efficiency of other methods by using a "hybrid" method with a large value of M at the top (say the first two levels) and a small value of M (or some elementary method) at the bottom. Again, efficient implementations of such methods can be quite complicated because of multiple node types.

For example, a two-level 32-way tree will divide the keys into 1024 categories, each accessible in two steps down the tree. This would be quite useful for files of thousands of keys, because there are likely to be (only) a few keys per category. On the other hand, a smaller M would be appropriate for files of hundreds of keys, because otherwise most categories would be empty and too much space would be wasted, and a larger M would be appropriate for files with millions of keys, because otherwise most categories would have too many keys and too much time would be wasted.

It should be noted that a "hybrid" searching method corresponds quite closely to the way humans typically search for things. For example, names in a telephone book. The first step is a multiway decision ("Let's see, it starts with 'A'"), followed perhaps by some two way decisions ("It's before 'Andrews', but after 'Aitken'") followed by sequential search ("'algonquin' . . . 'Algren' . . . No, 'Algorithms'isn't listed!").

Multiway radix searching can be systematically adapted the structure to work with arbitrary file sizes. The radix "trie" searching method as outlined above has two annoying flaws: (1) "one-way branching" which leads to the creation of extra nodes in the tree, and (2) two different types of nodes in the tree, which complicates software code writing somewhat (especially the insertion code). D. R. Morrison in the previously referenced book described a way to avoid both of these problems in a method which he named "Patricia" ("Practical Algorithm To Retrieve Information Coded In Alphanumeric"). In the present context, Patricia allows searching for N arbitrarily long keys in a tree with just N nodes, but requires only one full key comparison per search.

One-way branching is avoided by a simple device: each node contains the index of the bit to be tested to decide which path to take out of that node. External nodes are avoided by replacing links to external nodes with links that point upwards in the tree. Thus, normal type of tree node with a key and two links is formed. But in "Patricia", the key in the nodes is not used on the way down the tree to control the search, they are merely stored there for reference when the bottom of the tree is reached. To see how "Patricia" works the sample keys of Table 1 will be used again to form the "Patricia" tree shown in FIG. 4 when the keys are successively inserted. To search in this tree, the algorithm starts at the root and proceeds down the tree, using the bit index in each node to tell which bit to examine in the search key going right if that bit is 1, left if it is 0. The keys in the nodes are not examined at all on the way down the tree. Eventually, an upwards link is encountered. Each upward link points to the unique key in the tree that has the bits that would cause a search to take that link. For example, S is the only key in the tree that matches the bit pattern 10×11. Thus if the key at the node pointed to by the first upward link encountered is equal to the search key, then the search is successful, otherwise it is unsuccessful. For "trie" searching, all searches terminate at external nodes, whereupon one full key comparison is done to determine whether the search was successful or not. Furthermore, it's easy to test whether a link points up, because the bit indices in the nodes (by definition) decrease as we travel down the tree.

Figure 4:
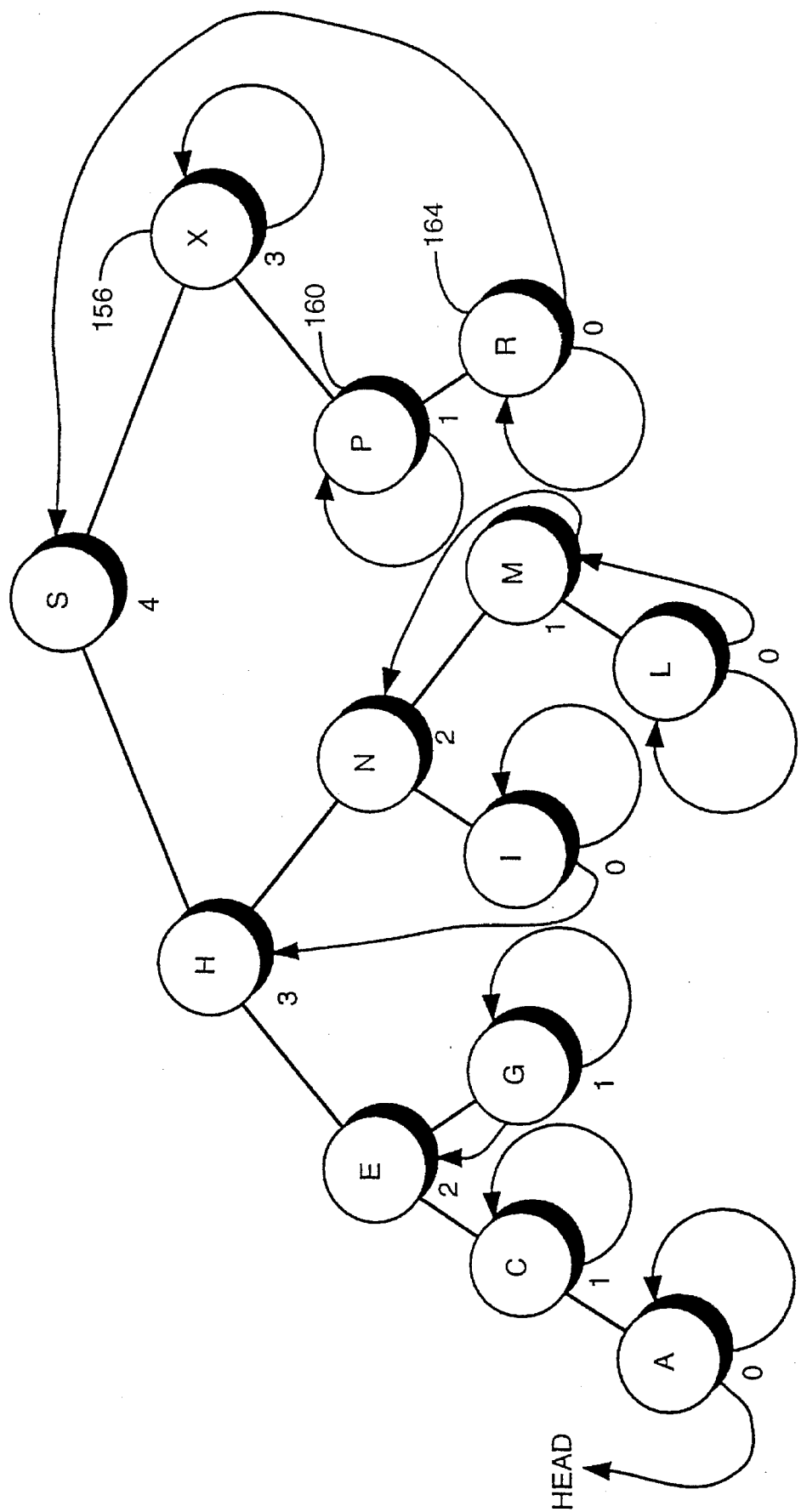
FIG. 4 is a block diagram of a prior art "Patricia" search tree.
Figure 5:
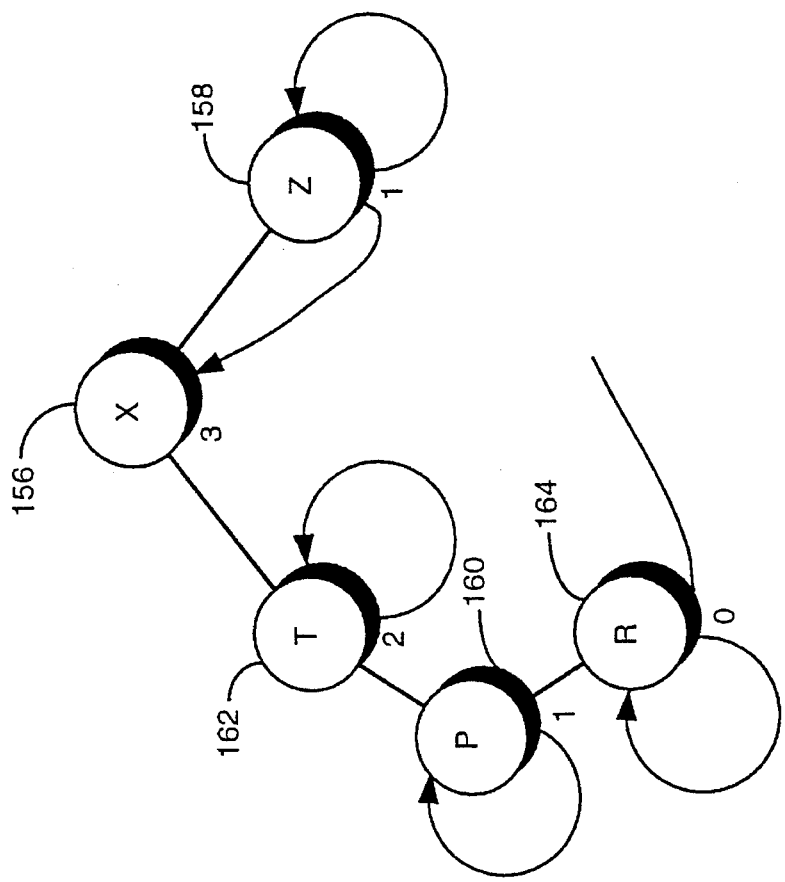
FIG. 5 is a block diagram of modifications to the prior art "Patricia" search tree shown in FIG. 4 when additional nodes are added.
Figure 5:
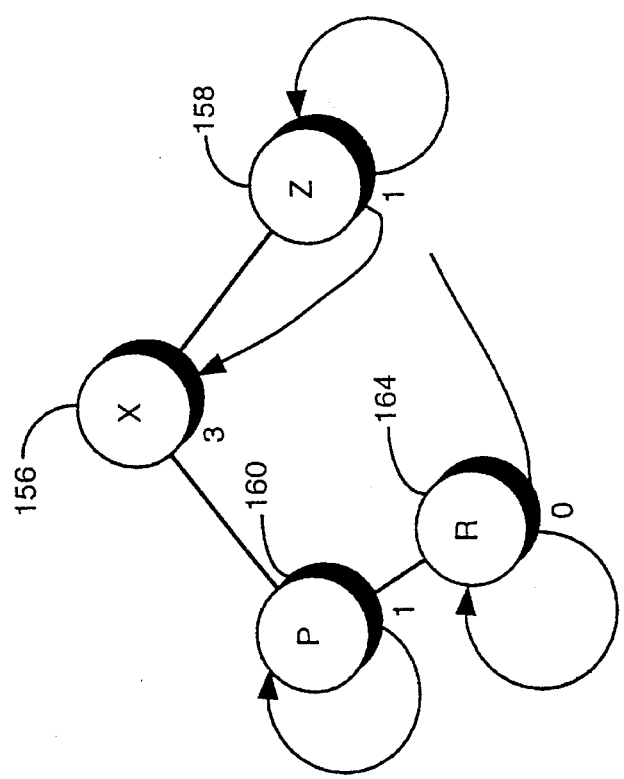

The diagram shown in FIG. 5 depicts the transformations made on the right subtree of the "Patricia" tree shown in FIG. 4, if Z and then T are added. The search for Z=11010 ends at the node 156 containing X=11000. By the defining property of the tree, X is the only key in the tree for which a search would terminate at that node 156. If Z is inserted, there would be two such nodes, so the upward link that was followed into the node 156 containing X should be made to point to a new node 158 containing Z, with a bit index corresponding to the leftmost point where X and Z differ, and with two upward links: one pointing to the X node 156 and the other pointing to the Z node 158. This corresponds precisely to replacing the external node containing X with a new internal node 152 with X and Z as sons of another node 154 in the radix "trie" insertion shown in FIG. 2, with one-way branching eliminated by including the bit index.

The insertion of T=10100 illustrates a more complicated case. The search for T ends at P=10000, indicating that P node 160 is the only key in the tree with the pattern 10×0×. Now, T and P differ at bit 2, a position that was skipped during the search. The requirement that the bit indices decrease as we go down the tree dictates that T node 162 be inserted between X node 156 and P node 160, with an upward self pointer corresponding to its own bit 2. Note carefully that the fact that bit 2 was skipped before the insertion of node T 162 implies that P node 160 and R node 164 have the same bit 2 value.

"Patricia" is a very good radix searching method, because it manages to identify the bits which distinguish the search keys and build them into a data structure (with no surplus nodes) that quickly leads from any search key to the only key in the data structure that could be equal.

Unlike standard binary tree searches, the radix methods are insensitive to the order in which keys are inserted; they depend only upon the structure of the keys themselves. For "Patricia" the placement of the upwards links depend on the order of insertion, but the tree structure depends only on the bits in the keys, as for the other methods. Thus, even Patricia would have trouble with a set of keys likes 001, 0001, 00001, 000001, etc., but for normal key sets, the tree should be relatively well balanced so the number of bit inspections, even for very long keys, will be roughly proportional to log N when there are N nodes in the tree.

The most useful feature of radix trie searching is that it can be done efficiently with keys of varying length. In all of the other searching methods we have seen the length of the key is "built into" the searching procedure in some way, so that the running time is dependent on the length of the keys as well as the number of keys. The specific savings available depends on the method of bit access used. For example, suppose we have a computer which can efficiently access 8-bit "bytes" of data, and we have to search among hundreds of 1000-bit keys. Then "Patricia" would require access of only about 9 or 10 bytes of the search key for the search, plus one 125-byte equality comparison while hashing requires access of all 125-bytes of the search key for computing the hash function plus a few equality comparisons, and comparison-based methods require several long comparisons. This effect makes "Patricia" (or other similar radix "trie" searching with one-way branching removed) the search method of choice when very long keys are involved.

The application of radix type searching techniques to communication networks was described in a paper by Paul F. Tsuchiya entitled "A Search Algorithm For Table Entries With Non-contiguous Wildcarding" that was published on the internet and is available by e-mail requests to tsuchiya@thumper.bell core. com.

Communications networks include switches (also called routers) which forward protocol data unit (i.e., packets) or setup calls by matching the addressing information in the packet or call with a route. Making this matching usually involves searching a routing table. However, the structure of communications network addresses is such that many common sorting and searching algorithms do not work for the routing table lookup function.

This is because addresses can be hierarchical. As a result, part of the entry stored in a routing table may be wildcarded, meaning that multiple addresses can be matched with the entry in the routing table. Further, different addresses in the routing table may have different parts of the address wildcarded. As a result, a given address may match several entries in the routing table, and the "best match must be found (where best is typically the match with the least wildcarding). To complicate matters further, the wildcarded portion of the address does not have to be contiguous. As a result, the set of addresses defined by a wildcarded routing table entry may not be a contiguous range.

Because of these peculiarities of hierarchical addresses, common sorting and searching algorithms such as the greater-than/less-than binary search and the "Trie" algorithm do not work efficiently with non-contiguous hierarchical addresses. The "Patricia" algorithm can be made to work with non-contiguous hierarchical addresses, by virtue of the fact that "Patricia" does not exclusively work from one end of the search key (the address) to the other, but can jump around to various bits. However, "Patricia" has no delete operation. This makes sense in that "Patricia" was designed for a library application, where items tend only to added. However, this is inappropriate for the routing table function, where entries can be added and deleted relatively often and leaving unnecessary entries can quickly consume large quantities of a memory resource in a router.

Tsuchiya's paper describes an algorithm that efficiently searches a routing table with non-contiguous hierarchical addresses. This algorithm is commonly known as "Cecilia". Both the add and remove operations for "Cecilia" are efficient and "Cecilia" handles the case where not all entries in a subset of the address hierarchy share a wildcard.

Like "Patricia", the search graph formed by "Cecilia" is dependent on the order in which entries are added. Therefore, the "Cecilia" graph in not necessarily well-balanced. "Cecilia" also tends to match earlier on small masks rather than large, but unlike "Patricia", it does not check bits solely for the purpose of determining if there are no matching entries. Therefore, the "Cecilia" lookup operation should run a little faster on average than "Patricia".

As with any binary searching mechanism, "Cecilia" operates by partitioning the set of entry values that need to be searched into two groups, such that any search key can efficiently be placed into one of the groups. Each group is similarly partitioned into two more groups. The search key for the following example corresponds to an address in a data packet or call setup. Also, an entry is the totality of information being searched for, including such information as the next hop routing information. In addition, an entry value is the wildcarded value that the key is matched against during the search such that every bit of a value is either a 0, 1, or X (i.e., X indicates a wildcard bit).

With most search algorithms, this process is iterated until each remaining group has only one entry. These single entries are the leaves of the tree (i.e., external nodes). However, since with nested, non-contiguous entry values a key may match multiple entries, it is not always possible to create groups with only one entry. Therefore, when there is a multiple-entry group that cannot be further partitioned, a linear search of the remaining values is done, in order of smallest wildcard first.

Figure 6:
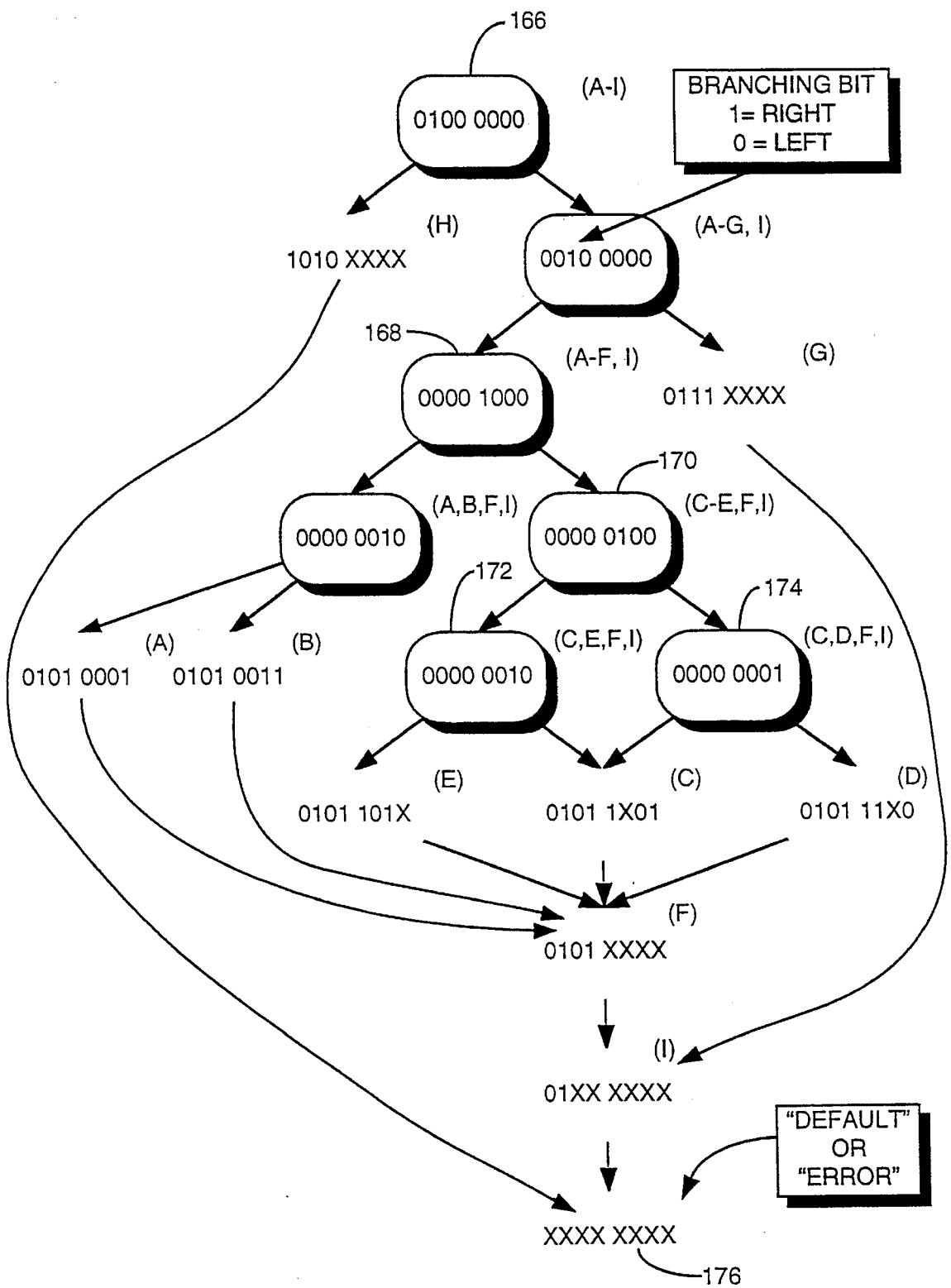
FIG. 6 is a block diagram of a prior art "Cecilia" search tree.

The criteria for placing an entry (and ultimately a key) into one group or another is whether a particular bit position for the entry value is a one or a zero. If the bit is wildcarded for an entry, then that bit can be either a one or a zero, and so that entry is replicated and placed into both groups (although it does not become two nodes in the "Cecilia" graph). To minimize the number of replicated entries, basic "Cecilia" partitions a group on a bit such that (1) the maximum number of entries in the group are wildcarded for that bit, and (2) there are entries with ones and entries with zeros for that bit. Satisfying these two criteria insures that the resulting branch is doing useful work (that is, partitioning the group into two smaller groups). "Cecilia" is best explained with an example. Table 2 shows a set of entries and the corresponding "Cecilia" searching tree is shown in FIG. 6.

TABLE 2

| A | 0101 | 0001 |
|---|------|------|
| B | 0101 | 0011 |
| C | 0101 | 1X01 |
| D | 0101 | 11X0 |
| E | 0101 | 101X |
| F | 0101 | XXXX |
| G | 0111 | XXXX |
| H | 1010 | XXXX |
| I | 01XX | XXXX |

The notation is in binary. Positions with 1 or 0 are not wildcarded, and positions with X are. The searching algorithm is similar to other radix searching methods in that when at a branching node, branch right if the branching bit is 1 and branch left if the branching bit is 0. Otherwise, if an entry matches a key, then the search is completed or if no match then go to a descendent node.

The lookup algorithm for the "Cecilia" tree goes as follows. The circled nodes in the "Cecilia" graph are branching nodes. The un-circled nodes are entries. The value in the branching node shows which bit should be tested. To search the tree, go to the starting branching node (the top one, with nothing pointing to it). If the key bit position indicated by the branching bit is a 1, then go to the node indicated by the right arrow. If the key bit position indicated by the branching bit is a 0 then go to the node indicated by the left arrow. When an entry is reached, test to see if all non wildcarded bit positions match those of the key. If they all match, then the best entry has been found, and the search is over. If any do not match, then go to the node indicated by the exiting arrow. Note that the bottom entry (that with no exiting arrows) will match all keys. Reaching this node indicates that none of the entries match (unless of course one of the entries is an all-wildcard).

By looking at FIG. 6, it should be noted that the grouping criteria of picking the bit with the least wildcarding results in an unbalanced tree. For instance, the only bit positions that are (1) not wildcarded for all entries, and (2) has both ones and zeros, are 1000 0000 and 0100 0000. Either of these bits partitions the entries into two groups: (A-G,I), and (H). This grouping is represented in the "Cecilia" graph by the first branching node 166, which branches on bit 0100 0000.

Notice that the third branching node (0000 1000) 168 partitions (A-F,I), and (C-E,F,I). There is no bit position for group (C-E,F,I) (node 170) that is not wildcarded for all five entries that have both ones and zeros. However, bit positions 0000 0001, 0000 0010, and 0000 0100 each have two entries that have a one and a zero. If 0000 0100 is chosen as the next branching bit, we see that Entry C is replicated into two groups, (C,E,F,I) and (C,D,F,I) (i.e., nodes 171 and 174, respectively). Branching bit 0000 0010 partitions C from E, and branching bit 0000 0001 partitions C from D. As a result, there are two ways to reach C.

The groups (A,F,I), (B,F,I), . . . ,(E,F,I) cannot be further partitioned, because there no bit positions where there are both ones and zeros. Therefore, each of these groups are linearly searched in order of smallest wildcard first. However, this does not require that F, for instance, be replicated 6 times. Since F is an ancestor of A-E, then entries A-E all point to F. I is an ancestor of F and H, so F and H point to I. Finally, I points to an all-wildcard entry, which is the ancestor of everything. The all-wildcard entry is a "default" or "error" entry. This is called the home node 174.

A need still exists for a radix tree searching algorithm which is optimized [or many types of communication network processing operations (including but not limited to network addressing like "Cecilia" was limited). It will be appreciated by those skilled in the art that the following hybrid radix tree searching algorithm can also be applied to other types of searching operations outside of communication network processing (e.g., general database lookup, search engines, pattern recognition, etc.

The key to the hybrid radix tree searching algorithm is that it must work within a hardware implementation of a switch and provide a full-function bridge/routing capability. Specifically, it must be able to handle bridging and routing of any protocol, new or existing, as well having a rich filtering capability. Since new protocols and media are continually being developed, any hardware-based solution must be fully programmable, so that new protocols or changes to existing protocols can be supported without changes to the hardware. In addition, new and faster media are constantly being created. Any hardware-based architecture must be adaptable to accommodate newer, faster media. As a consequence of this, it is highly desirable that the routing system be well suited to pipelining and/or parallel processing.

The following hybrid radix tree searching can meet the requirements discussed above. Specifically, it can provide full bridging and routing functionality, while retaining the scalability needed to provide arbitrary levels of performance.

The basic idea behind radix tree searching (e.g., routing) is actually quite simple. The header of a protocol data unit that needs to be forwarded is treated as a single, albeit quite long, sequence of binary digits. This number is used to search a binary tree. Each bit of the packet is used to determine which branch to follow at each node in the tree. When a leaf node is reached, all the information needed to process the packet is implicit in the location of the leaf node and the path taken to reach it.

The primary advantages of this technique are that it operates in bounded and reasonable time (order of log n) and it processes a packet in "semi- sequential fashion". As will be discussed later, these properties are essential to a hardware-based routing implementation.

While it should be clear that such a process will find a distinct leaf for each possible forwarding case, a number of additional techniques need to be applied to overcome some difficulties introduced by use of such a simple approach. Chief among the problems is the potentially extremely large size of the solution space embodied in the simplistic lookup tree, which, at first glance, would appear to be on the order of 2- locations with a very large value of n.

As described above, any direct implementation of a radix tree search would appear to be prohibitively expensive to implement, due to the large size of the search tree (i.e., $2^n$ nodes). An examination of a few network layer protocols, however, shows that there are a large number of bits that are identical in every valid packet of a given protocol. Thus, for network layer protocol identification this tree structure can be optimized into a "long limbed" tree structure.

The lookup tree tends to consists of long sequences of nodes that represent these specific bit patterns which are common to all packets of a given protocol. Only one specific sequence can lead to a "forwarding" leaf. All other sequences lead to "exception" leaves, which indicate that the packet cannot be forwarded normally. It is this same sort of property that is taken advantage of by so-called "Patricia" style routing table managers, since actual IP address spaces tend to have this same sort of "long limbed" property (i.e., low entropy).

The real point is that there are a relatively small number of header bits that are actually "signal" bits (i.e., identification decision significant bits). The rest, while needed to complete processing of a packet by end systems, perhaps, are not needed to forward a packet. Thus, the preferred embodiment of the present invention, like the "Patricia" and "Cecilia" algorithms (i.e., shown and described in reference to FIGS. 4 and 6, respectively) makes decisions (e.g., branches from one node to the next) only based on these "signal" bits.

In designing any communication network processing system which uses a radix tree, it is desirable to minimize the depth of the tree. This tree depth determines the number of operations needed to complete the packet processing (i.e., determines the upper bound on processing speed). In order to minimize the depth of the tree, there are some techniques that can be used which have the effect of compressing out layers of the tree (i.e. reducing the average tree depth).

Unlike "Patricia" or "Cecilia" which only test one bit at a time, the first technique is to test multiple, non-contiguous "signal" bits, simultaneously. This has the effect of compressing the long tree limbs, which are checking key "signal" bits in the header for a specific value or set of values, into a single operation.

The second technique is to compress several unrelated tree branches into single operations using this bit-gathering method in combination with a vector jump technique. Such a compression technique was shown and described in reference to the multiway radix search tree of FIG. 3; however, this multiway search only looked at contiguous bits in a data stream without regard to whether or not they were "signal" bits.

Figure 7:
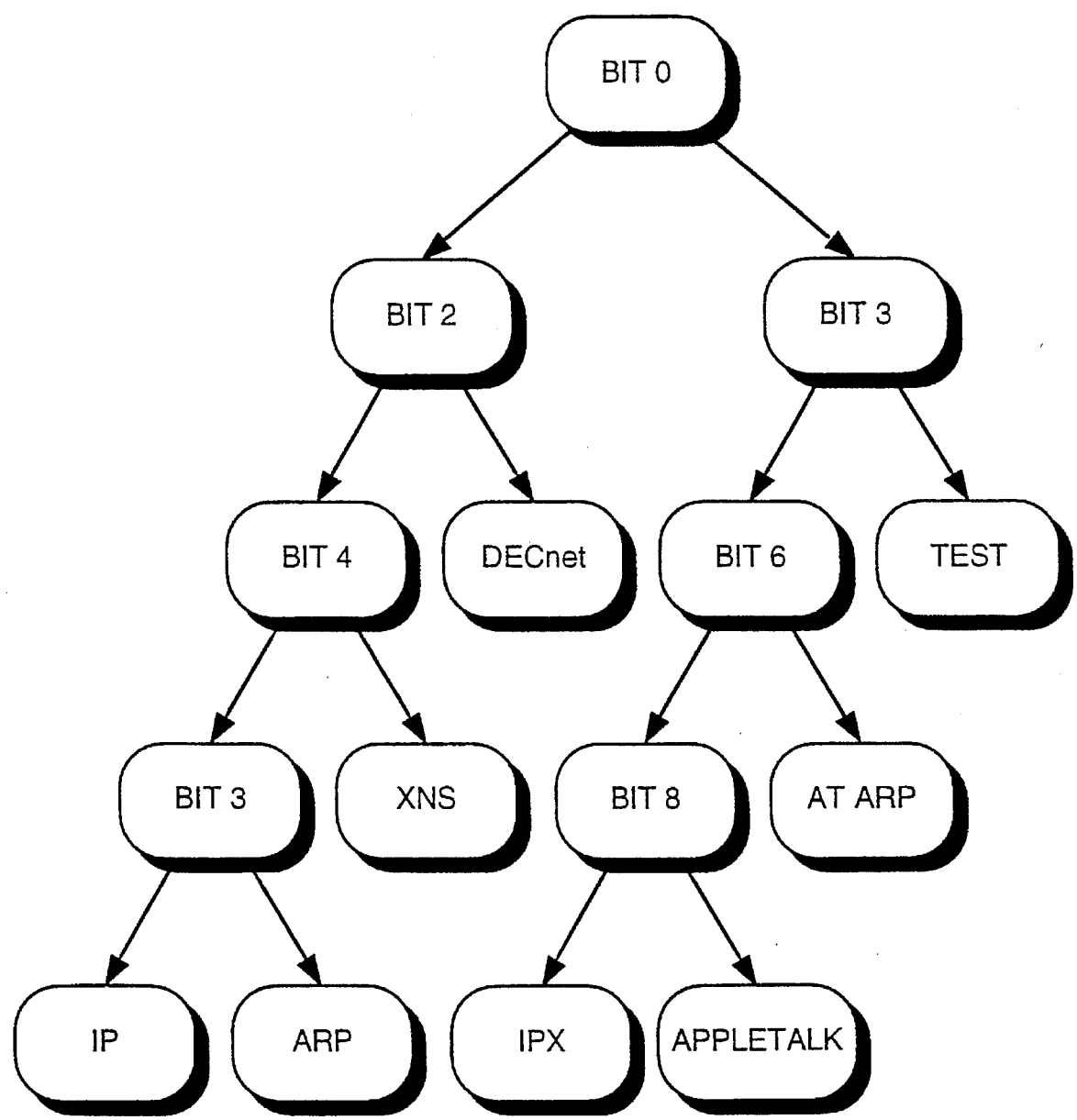
FIG. 7 is a block diagram depicting a preferred embodiment hybrid radix search tree in accordance with the present invention.
Figure 8:
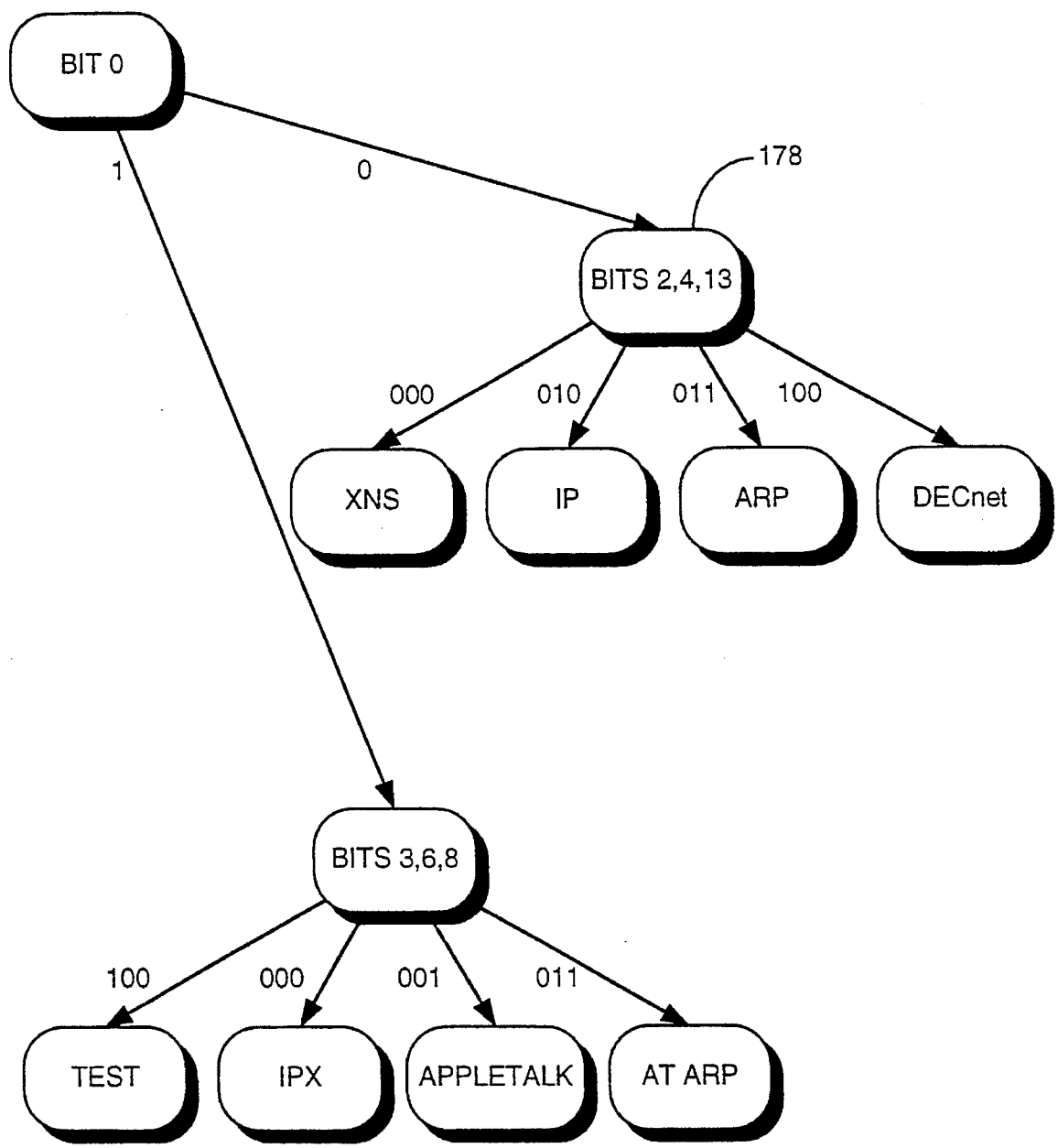
FIG. 8 is a block diagram depicting an alternative preferred embodiment hybrid radix search tree in accordance with the present invention which uses a bit gathering operation.

Referring to FIGS. 7 and 8, a preferred embodiment of this hybrid radix tree data structure is shown. The compressive effect of these techniques is illustrated. In this example, the identification of a protocol type using the radix-tree techniques by examining the ethertype field of an ethernet packet header is shown. The diagram in FIG. 7 shows the structure of a tree that can find the protocol type with single-bit operations. This method requires five operations to determine the packet type. By using multiple-bit, vector operations, this can be compressed into three operations as shown in FIG. 8. It should be noted that both of these hybrid radix tree methods must do a final comparison, like "Patricia" and "Cecilia" to eliminate unknown protocols. It will be appreciated by those skilled in the art that these diagrams are only one possible organization for a protocol type tree. In addition, these techniques can be readily applied to other searching operations, such as security monitoring for a particular bit sequence or the like.

Figure 9:
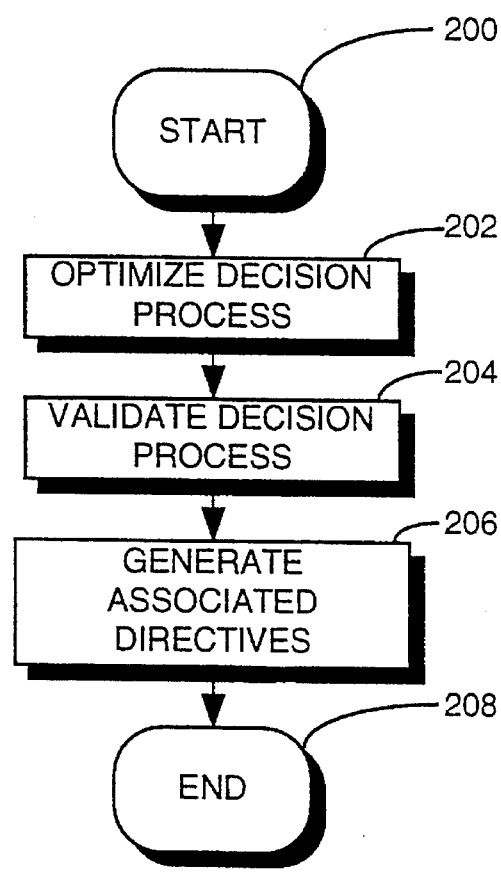
FIG. 9 is a flowchart of the preferred embodiment operations of the hybrid radix search tree shown in FIG. 7 in accordance with the present invention.

This protocol data unit (e.g., packet) processing method can be summarized in reference to the flowchart elements 200 through 208 shown in FIG. 9 as including optimizing 202 a decision process (e.g., identifying the protocol data unit) by selectively examining only those bits of a protocol data unit, represented by a stream of bits received from a communication network, which affect the decision process. This selective examination of bits preferably is done according to a radix-type decision process. Also, this selective examination may be enhanced by examining several decision significant bits (i.e., "signal" bits) of the protocol data unit in a single step of the decision process. These decision-significant bits preferably are two or more non-contiguously positioned bits out of the stream of bits which represent the received protocol data unit. In addition, the decision-significant bits may further include two or more contiguously positioned bits out of the protocol data unit stream. Subsequently, the decision process is validated 204 by comparing a portion of the received protocol data unit with a predetermined tuple. This validation process may be enhanced by splitting the validation into parts by beginning validating after a portion of the decision process is completed and before all of the decision process is completed. The predetermined tuple having known values for a specific portion of the stream of bits which includes the two or more non-contiguously positioned decision-significant bits. Associated directives for the protocol data unit are generated 206 based upon the validated decision process. This at least one associated directive specifying subsequent processing requirements of the protocol data unit.

Figure 10:
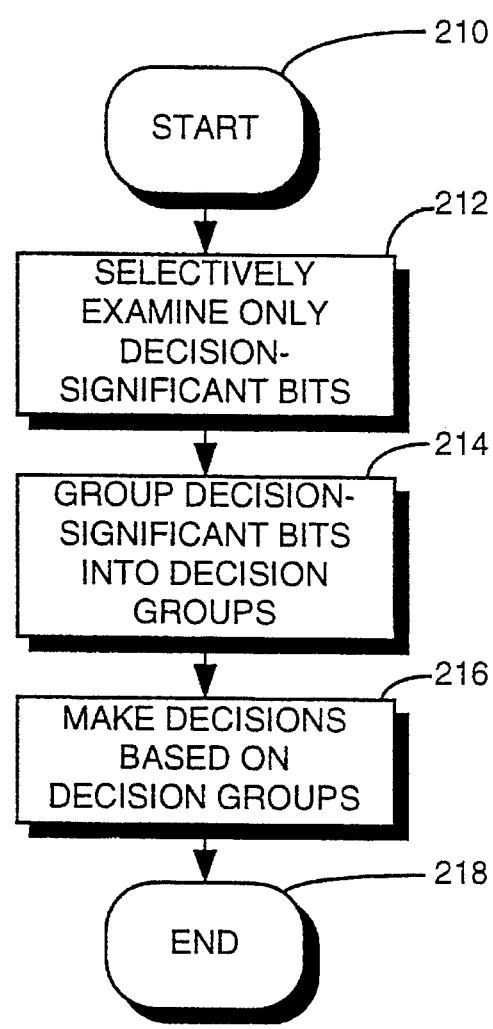
FIG. 10 is a flowchart of the alternative preferred embodiment operations of the hybrid radix search tree shown in FIG. 8 in accordance with the present invention.

This protocol data unit (e.g., packet) radix-type decision processing method alternatively can be summarized in reference to the flowchart elements 210 through 218 shown in FIG. 10 as including selectively examining 212 only those bits of a protocol data unit, represented by a stream of bits received from the communication network, which affect the radix-type decision process (e.g., bits 0, 2, 3, 4, 6, 8, and 13 as shown in FIG. 7). These decision-significant bits preferably are two or more non-contiguously positioned bits out of the stream of bits which represent the received protocol data unit. In addition, the decision-significant bits may further include two or more contiguously positioned bits out of the protocol data unit stream. Subsequently, the decision-significant bits are grouped 214 together into decision groups (e.g., decision group 178 shown in FIG. 8). Decisions in the decision process then are made 216 based on derision groups rather than individual decision-significant bits. This derision process preferably includes identifying, verifying, and determining subsequent processing needs of the protocol data unit.

The present invention hybrid radix decision process will now be described in reference to a particular communication network device. This particular network device is more thoroughly discussed in the previously identified related U.S. patent application Ser. No. 08/366,225 entitled "Method And Apparatus For Accelerated Packet Processing".

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed. The user is unaware of any of this, of course, but in fact that's what's happening while the words, "Please wait, your transaction is being processed" appears on the screen.

The ISO has specifically defined all seven layers, which are summarized below in the order in which the data actually flow as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems (i.e., layer 4 at the destination "confirms the request for a connection," so to speak, that it has received from layer 4 at the source).

Layer 3, the network layer, provides routing and relaying of data through the network (among other things, at layer 3 on the outbound side an "address" gets slapped on the "envelope" which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data move across those physical connections from layer 1 at the source to layer 1 at the destination.

Figure 11:
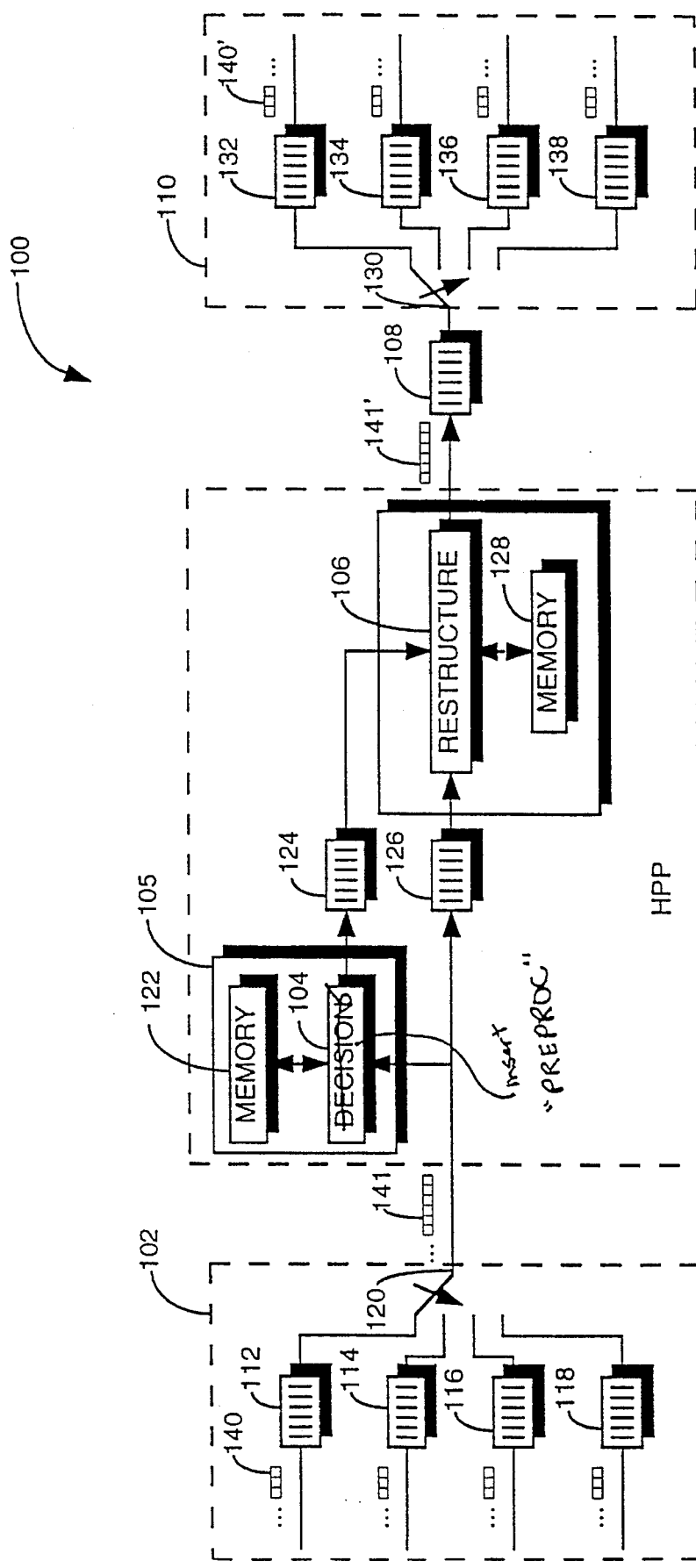
FIG. 11 is a block diagram of a preferred embodiment network device in accordance with the present invention.

Referring to FIG. 11, a preferred embodiment of a forwarding system in which a protocol data unit preprocessor 104 is used in a protocol data unit processing device 100 that operates in a communication network to transfer protocol data units (e.g., 140) within the communication network. The processing device 100 manipulates bits of information preferably at the OSI network, link and physical layers but can manipulate bits of information at all levels, and preferably performs as one or more network devices including, but not limited to, a bridge, a router, a switch, an inline filter, a protocol converter, an encapsulating device, and a security device. It will be appreciated that various types of communication networks exist which utilize processing devices that perform these functions including local protocol data unit source devices (e.g., desktop computers or workstations), local area networks, wide area networks, metropolitan area networks, and wireless networks. It will be appreciated by those skilled in the art that the processing device 100 may perform other network-based functions without departing from the scope and spirit of the present invention. In addition, other types of data in the communication network could readily be manipulated by the processing device 100, such as voice and video.

The processing device 100 includes an inbound interface 102 and outbound interface 110 which control the flow of protocol data units 140 and 140' into and out of the processing device 100, respectively (i.e., receive and transmit protocol data units. These interfaces 102 and 110 are configured differently depending on the type of communication network that the processing device 100 is connected to as well as the particular location within such a network that the processing device 100 is located.

For example, inbound interface 102 may include several memory buffers 112, 114, 116, and 118 which receive bits of information from several different network devices which are communicating bits of information on several types of OSI physical layer media (e.g., fiber optics, coaxial cable, or twisted pair wires) while using various types of OSI link layer signaling protocols (e.g., Fiber Distributed Data Interchange (FDDI) or ethernet) and various types of OSI network layer protocols (e.g., TCP/IP or DECnet). These network devices could be other processing devices (e.g., a matrix switching device or electronic bus) or end user devices (e.g., computers, network cards, video codecs, digital phones, other digitized video or audio sources such as voice, teleconferencing, or video conferencing, any other multimedia sources, or the like). The bits of information from the memory buffers 112, 114, 116, and 118 are combined together into a single stream of data bytes 141 by a demultiplexer 120 to form packets or cells. The demultiplexer 120 preferably combines the bytes of information of these packets or cells by periodically clocking information out of the memory buffers 112, 114, 116, and 118. In a similar manner, the outbound interface 110 includes a multiplexer 130 which periodically clocks a single stream of data bytes 141' out of memory buffer 108 and presents them to appropriate memory buffers 132, 134, 136, and 138 which are connected to outbound lines to the communication network. Alternatively, the inbound interface 102 and/or outbound interface 110 may consist of a single memory buffer and as such a multiplexer/demultiplexer arrangement as described would not be needed in the processing device 100.

The processing device 100 includes a preprocessor 104 which establishes subsequent processing requirements of a particular protocol data unit 140. The preprocessor 104 analyzes the inbound stream of data bits 141 from the inbound interface 102 to find the beginning of the particular protocol data unit 140 received from the communication network to generate at least one associated directive for the particular protocol data unit 140. A synchronizing mechanism 124, 126 is operatively coupled to the preprocessor 104 to synchronize the particular protocol data unit 140 (i.e., stored in buffer 126) with the at least one associated directive (i.e., stored in buffer 124) to generate a synchronized protocol data unit. A restructuring device 106 is operatively coupled to the synchronizing mechanism 124, 126 to restructure the synchronized protocol data unit in accordance with the at least one associated directive for the protocol data unit to generate a restructured protocol data unit 140'.

The preprocessor 104 includes a filter to selectively examine only those bits of a protocol data unit 140, represented by a stream of bits received from the communication network, which affect the decision process. These decision-significant bits consist of two or more non-contiguously positioned bits out of the stream of bits which represent the received protocol data unit 140. In addition, the decision-significant bits may further include two or more contiguously positioned bits out of the protocol data unit 140 stream. A validation device is operatively coupled to the filter to validate the decision process by comparing a portion of the protocol data unit with a predetermined tuple. The predetermined tuple having known values for a specific portion of the stream of bits which includes the two or more non-contiguously positioned decision-significant bits. Also, a generator is operatively coupled to the validation device to generate the one or more associated directives for the protocol data unit 140 which are based upon the validated decision process. These one or more associated directives essentially are a series of "rewrite instructions" specify subsequent processing requirements of the protocol data unit 140. In the preferred embodiment, the "rewrite instructions" represented by the associated directives are instructions which are executed by the reconfiguration processor 106 to transform a protocol data unit 140 into the restructured protocol data unit 140'.

The preprocessor 104 can be configured to perform several different types of decision processes. For example, the filter, validation device, and generator may be configured to identify the protocol data unit 140 type, source or destination address, and/or bit content.

The preprocessor 104 filter may be optimally configured to selectively examine decision-significant bits of the protocol data unit 104 according to a radix-type decision process. Also, the filter may be configured to selectively examine several decision-significant bits of the protocol data unit in a single step of the decision process to reduce processing steps and avoid "processor bottlenecks".

The operations of the preprocessor 104 may alternatively be described as a radix-based decision processor 104 for use in the communication network. The decision processor 104 includes a filter to selectively examine only those bits of a protocol data unit 140, represented by a stream of bits received from the communication network, which affect a radix-type decision process. These decision-significant bits consist of two or more non-contiguously positioned bits out of the stream of bits which represent the received protocol data unit 140. In addition, the decision-significant bits may further include two or more contiguously positioned bits out of the protocol data unit 140 stream. A grouping device is operatively coupled to the filter to group the decision-significant bits together into decision groups. A decision mechanism is operatively coupled to the grouping device to make decisions in the decision process based on decision groups rather than individual decision-significant bits. The decision mechanism preferably consists of components to implement a decision process which includes identifying, verifying, and determining subsequent processing needs of the protocol data unit 140. In addition, this decision processor 104 can be used in a protocol data unit processing system operated in the communication network to transfer protocol data units 140 within the communication network. When used in a protocol data unit processing system, the decision processor 104 preferably includes a generator which generates one or more associated directives derived from the determined subsequent processing needs of the protocol data unit 140. This processing system preferably operates in a manner similar to that which is described for the preprocessor 104 such that this processing system preferably also includes a synchronizing mechanism 124, 126 operatively coupled to the decision processor 104 and the communication network. Also, a restructuring device 106 is operatively coupled to the synchronizing mechanism 124, 126 to restructure the synchronized protocol data unit to generate a restructured protocol data unit 140'.

By utilizing the preprocessor 104 and restructuring device 106 of the present invention to split the required protocol data unit processing functions, a significantly increase in the through put of the processing device 100, both in terms of the number of data packets per second and in terms of the number of bits per second which pass through the processing device 100 is achieved.

The preprocessor 104 preferably establishes the subsequent processing requirements of the particular protocol data unit 104 by identifying, verifying, and generating at least one associated directive for the particular protocol data unit 140. These subsequent processing requirements fall into two distinct groups of processing types. The first group of processing types involves modifying the content of the synchronized protocol data unit. The restructuring device 106 does this modification preferably by restructuring the synchronized protocol data unit through deleting, inserting, and replacing bits in the synchronized protocol data unit in accordance with the at least one associated directive for the protocol data unit. The second group of processing types involves security or network monitoring functions. For this second group of processing types the restructuring device 106 monitors the synchronized protocol data unit by dropping, sending, sending a copy of, and auditing the contents of the synchronized protocol data unit in accordance with the at least one associated directive for the protocol data unit. The processing device 100 may be configured to perform either or both of these modification and monitoring processing functions. In addition, which processing functions may also be determined by the inbound memory buffers 112, 114, 116, or 118 from which the particular protocol data unit 140 originated.

In order to accelerate the processing of a received protocol data unit 140, the preprocessor 104 preferably is configured to operate on a first and a second protocol data unit such that the preprocessor 104 can interleave processing of both the first and the second protocol data unit during a single time span. In addition, multiple preprocessors connected in series may be used to increase the through put of protocol data units. This use of multiple preprocessors may necessitate the use of a more sophisticated synchronizing mechanism 124, 126 which is able to track and synchronize more that one protocol data unit at a time with the particular at least one associated directive for each protocol data unit. In addition, the preprocessor 104 is configured to begin the validation process after a portion of the decision process is completed and before all of the decision process is completed (e.g., establish the at least one associated directive for the particular protocol data unit 140 after having received only a portion (i.e., the first several bits or bytes) of the protocol data unit 140). The preprocessor 104 may need to buffer into memory 122 or sequentially store a portion of the particular protocol data unit 140 as it is received until a large enough portion or the particular portion of the protocol data unit 140 which enables the identification of the particular protocol data unit 140 is received. Similarly, the restructuring device 106 preferably is configured to operate on the synchronized protocol data unit prior to the protocol data unit processing device 100 receiving all of the protocol data unit 140. This optimization can be taken a step further by outputting a portion of the restructured protocol data unit 140' to a transmitting device 110 prior to receiving all of the protocol data unit 140. Further, the restructuring device 106 preferably indicates a particular transmit path (e.g., into buffer memory 108 through multiplexer 130 and transmitted from outbound interface 110 memory buffer 132 for one particular network type or media type connection onto the communication network) for the restructured protocol data unit 140'. All of these optimizations are particularly important when manipulating large protocol data units which extend over several frames or consist of several smaller parts that are received at various times and/or from various incoming interfaces 102.

Figure 12:
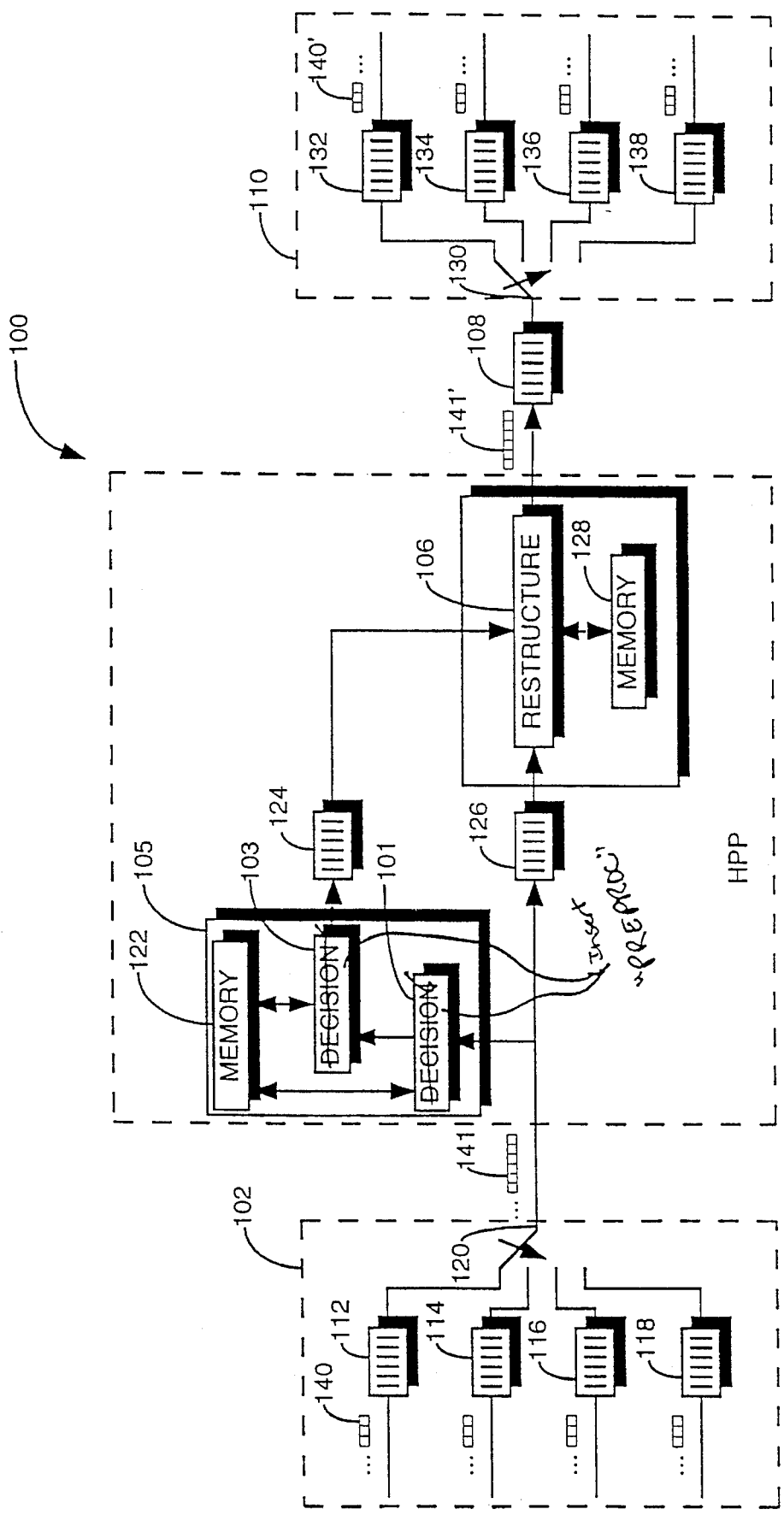
FIG. 12 is a block diagram of an alternative preferred embodiment network device having serial connected preprocessors in accordance with the present invention.

Turning once again to the multiple preprocessor configurations of the processing device 100. In the alternative embodiment serial configuration shown in FIG. 12, a first 101 and a second 103 preprocessor are operatively coupled to the inbound/receiving interface 102 to establishing subsequent processing requirements of a particular received protocol data unit 140 to generate at least one associated directive for the particular protocol data unit 140. The first preprocessor 101 is operatively connected in series to the second preprocessor 103 such that the first preprocessor 101 performs a portion of processing (e.g., begins the validation) necessary for generating the at least one associated directive (i.e., as described above in reference to preprocessor 104) and the second preprocessor 103 completes the processing necessary for generating the at least one associated directive. In this alternative embodiment, the first preprocessor 101 preferably optimizes a identification process by selectively examining only significant bits of the particular protocol data unit 140 which affect radix decision-based identification process which involves selectively examining several significant bits of the particular protocol data unit 140 in a single step of the decision process. In addition, the first preprocessor 101 verifies the identification process by comparing a portion of the particular protocol data unit 140 with a predetermined tuple. This predetermined tuple consists of known values for specific portions of the particular protocol data unit 140 which are stored in memory 122. Also, the second preprocessor 103 preferably generates the associated directives for the protocol data unit 140 based on the verified identification process. The remaining parts of the processing device 100 operate substantially as described above in reference into a single preprocessor-based processing device.

It will be appreciated by those skilled in the art that more than two preprocessors may be used to perform the functions described herein without departing from the scope and spirit of the present invention provided that the functions are divided in a manner consistent with the teachings of serial connections as described above.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A method of processing a protocol data unit in a communication network, comprising the device-implemented steps of:

(a) optimizing a decision process by selectively examining only those significant bits of a protocol data unit received from the communication network which affect the decision process, these decision-significant bits comprising at least two non-contiguous bits of the protocol data unit;

(b) validating the decision process by comparing a portion of the received protocol data unit with a predetermined tuple, the predetermined tuple consisting of known values for a specific portion of the protocol data unit including the at least two non-contiguous decision-significant bits; and (c) generating at least one associated directive for the protocol data unit based upon the validated decision process, the at least one associated directive specifying subsequent processing requirements of the protocol data unit.

2. The method of claim 1 wherein the decision process comprises identifying the protocol data unit.

3. The method of claim 1 wherein the decision-significant bits further comprise at least two contiguous bits of the protocol data unit.

4. The method of claim 1 wherein the step of optimizing comprises selectively examining decision-significant bits of the protocol data unit according to a radix-type decision process.

5. The method of claim 1 wherein the step of optimizing comprises selectively examining several decision-significant bits of the protocol data unit in a single step of the decision process.

6. The method of claim 1 wherein the step of validating comprises splitting the validation into parts by beginning validating after a portion of the decision process is completed and before all of the decision process is completed.

7. A method of radix-type decision processing a protocol data unit in a communication network, comprising the device-implemented steps of:

(a) selectively examining only those significant bits of a protocol data unit received from the communication network which affect a radix tree-type decision process, these decision-significant bits comprising at least two non-contiguous bits of the protocol data unit;

(b) grouping the decision-significant bits together into decision groups; and (c) making decisions in the decision process based on decision groups rather than individual decision-significant bits.

8. The method of claim 7 wherein the decision process comprises identifying, verifying, and determining subsequent processing needs of the protocol data unit.

9. The method of claim 7 wherein the significant bits further comprise at least two contiguous bits of the protocol data unit.

10. A protocol data unit preprocessing device for use in a communication network to optimize a decision process related to protocol data units within the communication network, the preprocessing device comprising:

(a) filter means for selectively examining only those bits of a protocol data unit received from the communication network which affect the decision process, these decision-significant bits comprising at least two non-contiguous bits of the protocol data unit;

(b) validation means, operatively coupled to the filter means, for validating the decision process by comparing a portion of the protocol data unit with a predetermined tuple, the predetermined tuple consisting of known values for a specific portion of the protocol data unit including the at least two non-contiguous decision-significant bits; and (c) generation means, operatively coupled to the validation means, for generating at least one associated directive for the protocol data unit based upon the validated decision process, the at least one associated directive specifying subsequent processing requirements of the protocol data unit.

11. The protocol data unit preprocessing device of claim 10 wherein the decision-significant bits further comprise decision-significant contiguous bits of the protocol data unit.

12. The protocol data unit preprocessing device of claim 10 wherein the filter means comprises means for selectively examining decision-significant bits of the protocol data unit according to a radix-type decision process.

13. The protocol data unit preprocessing device of claim 10 wherein the filter means comprises means for selectively examining several decision-significant bits of the protocol data unit in a single step of the decision process.

14. The protocol data unit preprocessing device of claim 10 wherein the validation means comprises means for splitting the validation into parts by beginning validating after a portion of the decision process is completed and before all of the decision process is completed.

15. A protocol data unit processing system for use in the communication network to transfer protocol data units within the communication network having the preprocessing device of claim 10 and further comprising:

synchronizing means, operatively coupled to the preprocessing device and the communication network, for synchronizing the received protocol data unit with the at least one associated directive for the protocol data unit to generate a synchronized protocol data unit; and restructuring means, operatively coupled to the synchronizing means, for restructuring the synchronized protocol data unit in accordance with the at least one associated directive for the protocol data unit to generate a restructured protocol data unit.

16. The protocol data unit processing system of claim 15 wherein the preprocessing device includes means for operating on a first and a second protocol data units such that the preprocessing device can interleave processing of both the first and the second protocol data units during a single time span, and wherein the synchronizing means comprises means for synchronizing both the first and the second protocol data units with the at least one associated directive for that particular protocol data unit.

17. The protocol data unit processing system of claim 16 wherein the preprocessing device comprises a first and a second preprocessor operatively connected in series such that the first preprocessor begins the processing necessary for implementing the filter means and the second preprocessor completes the processing necessary for implementing the generation means.

18. The protocol data unit processing system of claim 15 wherein the restructuring means includes means for restructuring the synchronized protocol data unit by deleting, inserting, and replacing bits in the synchronized protocol data unit in accordance with the at least one associated directive for the protocol data unit.

19. The protocol data unit processing system of claim 15 wherein the restructuring means includes means for monitoring the synchronized protocol data unit by dropping, sending, sending a copy of, and auditing the contents of the synchronized protocol data unit in accordance with the at least one associated directive for the protocol data unit.

20. The protocol data unit processing system of claim 15 further comprising receiving means, operatively coupled to the preprocessing device, for receiving the protocol data unit from the communication network.

21. The protocol data unit processing system of claim 15 further comprising transmitting means, operatively coupled to the restructuring means, for transmitting the reconstructed protocol data unit over the communication network.

22. A radix-based decision processor for use in a communication network, comprising:

(a) filter means for selectively examining only those significant bits of a protocol data unit received from the communication network which affect a radix-type decision process, these decision-significant bits comprising at least two non-contiguous bits of the protocol data unit;

(b) grouping means, operatively coupled to the filter means, for grouping the decision-significant bits together into decision groups; and (c) decision means, operatively coupled to the grouping means, for making decisions in the decision process based on decision groups rather than individual decision-significant bits.

23. The decision processor of claim 22 wherein the decision means comprises means for implementing a decision process which includes identifying, verifying, and determining subsequent processing needs of the protocol data unit.

24. The decision processor of claim 22 wherein the decision-significant bits further comprise at least two contiguous bits of the protocol data unit.

25. A protocol data unit processing system for use in the communication network to transfer protocol data units within the communication network having the decision processor of claim 23 which generates at least one associated directive derived from the determined subsequent processing needs of the protocol data unit and further comprising:

synchronizing means, operatively coupled to the decision processor and the communication network, for synchronizing the received protocol data unit with the at least one associated directive for the protocol data unit to generate a synchronized protocol data unit; and restructuring means, operatively coupled to the synchronizing means, for restructuring the synchronized protocol data unit in accordance with the at least one associated directive for the protocol data unit to generate a restructured protocol data unit.

26. The protocol data unit processing system of claim 25 wherein the decision processor includes means for operating on a first and a second protocol data units such that the decision processor can interleave processing of both the first and the second protocol data units during a single time span, and wherein the synchronizing means comprises means for synchronizing both the first and the second protocol data units with the at least one associated directive for that particular protocol data unit.

27. The protocol data unit processing system of claim 26 wherein the decision processor comprises a first and a second processor operatively connected in series such that the first processor begins the processing necessary for implementing the filter means and the second processor completes the processing necessary for implementing the decision means.

28. The protocol data unit processing system of claim 25 wherein the restructuring means includes means for restructuring the synchronized protocol data unit by deleting, inserting, and replacing bits in the synchronized protocol data unit in accordance with the at least one associated directive for the protocol data unit.

29. The protocol data unit processing system of claim 25 wherein the restructuring means includes means for monitoring the synchronized protocol data unit by dropping, sending, sending a copy of, and auditing the contents of the synchronized protocol data unit in accordance with the at least one associated directive for the protocol data unit.

30. The protocol data unit processing system of claim 25 further comprising receiving means, operatively coupled to the decision processor, for receiving the protocol data unit from the communication network.

31. The protocol data unit processing system of claim 25 further comprising transmitting means, operatively coupled to the restructuring means, for transmitting the reconstructed protocol data unit over the communication network.

* * * * *